(12) United States Patent
Boyd et al.

(10) Patent No.: US 11,594,256 B2
(45) Date of Patent: Feb. 28, 2023

(54) ADVANCED VIDEO EDITING TECHNIQUES USING SAMPLING PATTERNS

(71) Applicant: Snap Inc., Santa Monica, CA (US)

(72) Inventors: Nathan Kenneth Boyd, Los Angeles, CA (US); Devin Doty, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 33 days.

(21) Appl. No.: 17/323,208

(22) Filed: May 18, 2021

(65) Prior Publication Data

US 2021/0272600 A1  Sep. 2, 2021

Related U.S. Application Data

(63) Continuation of application No. 16/893,694, filed on Jun. 5, 2020, now Pat. No. 11,037,602, which is a continuation of application No. 15/691,393, filed on Aug. 30, 2017, now Pat. No. 10,726,872.

(51) Int. Cl.
| | |
|---|---|
| *H04N 5/93* | (2006.01) |
| *G11B 27/00* | (2006.01) |
| *G11B 27/031* | (2006.01) |
| *H04N 21/472* | (2011.01) |
| *H04N 21/431* | (2011.01) |
| *G06V 20/40* | (2022.01) |

(52) U.S. Cl.
CPC ........... *G11B 27/031* (2013.01); *G06V 20/46* (2022.01); *G06V 20/49* (2022.01); *H04N 21/4312* (2013.01); *H04N 21/47205* (2013.01)

(58) Field of Classification Search
USPC .................................................. 386/278–280
See application file for complete search history.

(56) References Cited

U.S. PATENT DOCUMENTS

| | | | |
|---|---|---|---|
| 6,144,873 A | 11/2000 | Madore et al. | |
| 6,369,727 B1 | 4/2002 | Vincze | |
| 6,624,846 B1 * | 9/2003 | Lassiter | G11B 27/34 348/E5.042 |

(Continued)

OTHER PUBLICATIONS

"U.S. Appl. No. 15/691,393, Advisory Action dated May 17, 2019", 3 pgs.

(Continued)

*Primary Examiner* — Nigar Chowdhury
(74) *Attorney, Agent, or Firm* — Schwegman Lundberg & Woessner, P.A.

(57) ABSTRACT

Systems and methods provide for advanced video editing techniques using sampling patterns. In one example, a computing device can receive a selection of a clip of a video and a sampling pattern. The computing device can determine a respective number of frames to sample from the clip for each interval of time over a length of time for a new clip. For example, the computing device can determine a function corresponding the pattern that relates time and the number of frames to sample, a histogram corresponding to the pattern, or a definite integral corresponding to the pattern, among other approaches. The computing device can extract these numbers of frames from the clip and generate the new clip from the extracted frames. The computing device can present the new clip as a preview and send the new clip to other computing devices.

20 Claims, 15 Drawing Sheets

(56) References Cited

U.S. PATENT DOCUMENTS

| | | | |
|---|---|---|---|
| 6,874,420 B2* | 4/2005 | Lewis, Jr. | ............ B41F 33/0081 |
| | | | 700/125 |
| 8,751,448 B1 | 6/2014 | Douglis et al. | |
| 9,077,315 B2 | 7/2015 | Bogdan | |
| 9,390,752 B1 | 7/2016 | Mcneill et al. | |
| 9,972,360 B2 | 5/2018 | Song et al. | |
| 10,726,872 B1 | 7/2020 | Boyd et al. | |
| 11,037,602 B2 | 6/2021 | Boyd et al. | |
| 2002/0190198 A1 | 12/2002 | Mickael | |
| 2005/0075167 A1* | 4/2005 | Beaulieu | ................ G06F 17/00 |
| | | | 463/32 |
| 2006/0109283 A1 | 5/2006 | Shipman et al. | |
| 2006/0197690 A1 | 9/2006 | Liu et al. | |
| 2008/0072139 A1* | 3/2008 | Salinas | ............... G06F 16/9577 |
| | | | 715/764 |
| 2008/0304806 A1 | 12/2008 | Lin | |
| 2009/0147848 A1 | 6/2009 | Park et al. | |
| 2010/0064239 A1 | 3/2010 | Crawford et al. | |
| 2010/0074590 A1 | 3/2010 | Momosaki | |
| 2011/0194024 A1 | 8/2011 | Stefanoski et al. | |
| 2011/0217019 A1 | 9/2011 | Kamezawa et al. | |
| 2012/0210221 A1 | 8/2012 | Khan et al. | |
| 2012/0213497 A1 | 8/2012 | Lou et al. | |
| 2012/0311091 A1 | 12/2012 | Dingler et al. | |
| 2013/0104042 A1 | 4/2013 | Meaney et al. | |
| 2013/0125000 A1 | 5/2013 | Fleischhauer et al. | |
| 2014/0037216 A1 | 2/2014 | Kumar et al. | |
| 2014/0282772 A1 | 9/2014 | Chen et al. | |
| 2015/0154452 A1 | 6/2015 | Bentley | |
| 2015/0177940 A1 | 6/2015 | Trevino et al. | |
| 2015/0302600 A1 | 10/2015 | Kreder, III | |
| 2015/0373380 A1 | 12/2015 | Tsukagoshi | |
| 2016/0014433 A1 | 1/2016 | Raina et al. | |
| 2016/0132231 A1 | 5/2016 | Rathod | |
| 2016/0022541 A1 | 8/2016 | Lee et al. | |
| 2016/0259497 A1 | 9/2016 | Foss et al. | |
| 2017/0163378 A1 | 6/2017 | Baptist et al. | |
| 2017/0195142 A1 | 7/2017 | Sanderovich et al. | |
| 2017/0200193 A1 | 7/2017 | Bigley | |
| 2017/0331952 A1 | 11/2017 | Rogers et al. | |
| 2017/0359518 A1 | 12/2017 | De Foras et al. | |
| 2018/0000371 A1 | 1/2018 | Gupta et al. | |
| 2018/0033463 A1 | 2/2018 | Lee et al. | |
| 2018/0035075 A1 | 2/2018 | Lee et al. | |
| 2018/0063548 A1 | 3/2018 | Namjoshi et al. | |
| 2018/0089512 A1 | 3/2018 | Traff | |
| 2020/0302969 A1 | 9/2020 | Boyd et al. | |

OTHER PUBLICATIONS

"U.S. Appl. No. 15/691,393, Examiner Interview Summary dated Sep. 11, 2019", 3 pgs.

"U.S. Appl. No. 15/691,393, Final Office Action dated Mar. 4, 2019", 22 pgs.

"U.S. Appl. No. 15/691,393, Final Office Action dated Dec. 4, 2019", 23 pgs.

"U.S. Appl. No. 15/691,393, Non Final Office Action dated Jun. 13, 2019", 22 pgs.

"U.S. Appl. No. 15/691,393, Non Final Office Action dated Oct. 4, 2018", 19 pgs.

"U.S. Appl. No. 15/691,393, Notice of Allowance dated Mar. 12, 2020", 9 pgs.

"U.S. Appl. No. 15/691,393, Response filed Feb. 4, 2020 to Final Office Action dated Dec. 4, 2019", 17 pgs.

"U.S. Appl. No. 15/691,393, Response filed Dec. 19, 2018 to Non Final Office Action dated Oct. 4, 2018", 10 pgs.

"U.S. Appl. No. 15/691,393, Response filed May 3, 2019 to Final Office Action dated Mar. 4, 2019", 11 pgs.

"U.S. Appl. No. 15/691,393, Response filed Sep. 12, 2019 to Non-Final Office Action dated Jun. 13, 2019", 15 pgs.

"U.S. Appl. No. 16/893,694, Non Final Office Action dated Oct. 26, 2020", 11 pgs.

"U.S. Appl. No. 16/893,694, Notice of Allowance dated Feb. 11, 2021", 9 pgs.

"U.S. Appl. No. 16/893,694, Response filed Jan. 18, 2021 to Non Final Office Action dated Oct. 26, 2020", 8 pgs.

* cited by examiner

ADVANCED VIDEO EDITING TECHNIQUES USING SAMPLING PATTERNS

CLAIM OF PRIORITY

This application is a continuation of and claims the benefit of priority to U.S. patent application Ser. No. 16/893,694, filed on Jun. 5, 2020, which is a continuation of and claims the benefit of priority to U.S. patent application Ser. No. 15/691,393, filed on Aug. 30, 2017, which are incorporated herein by reference in their entireties.

TECHNICAL FIELD

The present disclosure generally relates to the field of video editing, and more particularly to video editing on portable computing devices.

BACKGROUND

A popular feature of many portable computing devices, such as laptops, tablets, smartphones, media players, and wearable devices (e.g., watches, eyeglasses and other head-mounted displays, etc.), among others, is a camera for capturing photographs and video. With such devices at their immediate disposal, users can record more of their experiences than ever before. Users often like to edit these photos and videos to share with friends and family. However, conventional devices do not support video editing or only provide a rudimentary set of editing tools (e.g., trimming segments at the beginning or end of a video, splitting a large video into smaller clips, or joining several video clips into a larger video). Conventional video editing software typically requires users to overcome a steep learning curve. Even professional film editors need to spend a lot of time and effort to edit video, which may not be practical for users making personal videos of a generally non-commercial and ephemeral nature. In addition, form factors for portable computing devices may inhibit or preclude more complex video editing techniques. For example, conventional video editing software is usually only available for desktops, workstations, servers, and the like because of the large amounts of processing, memory, storage, network, power, and other resources the software needs for operation; portable computing devices may not have enough space to accommodate these amounts of computing resources because of the relatively small size of the portable devices. Portable computing devices also usually comprise relatively small touchscreens that can make fine-tuned edits difficult.

BRIEF DESCRIPTION OF THE DRAWINGS

The present disclosure will describe various embodiments with reference to the drawings, in which.

DETAILED DESCRIPTION

Figure 1A:
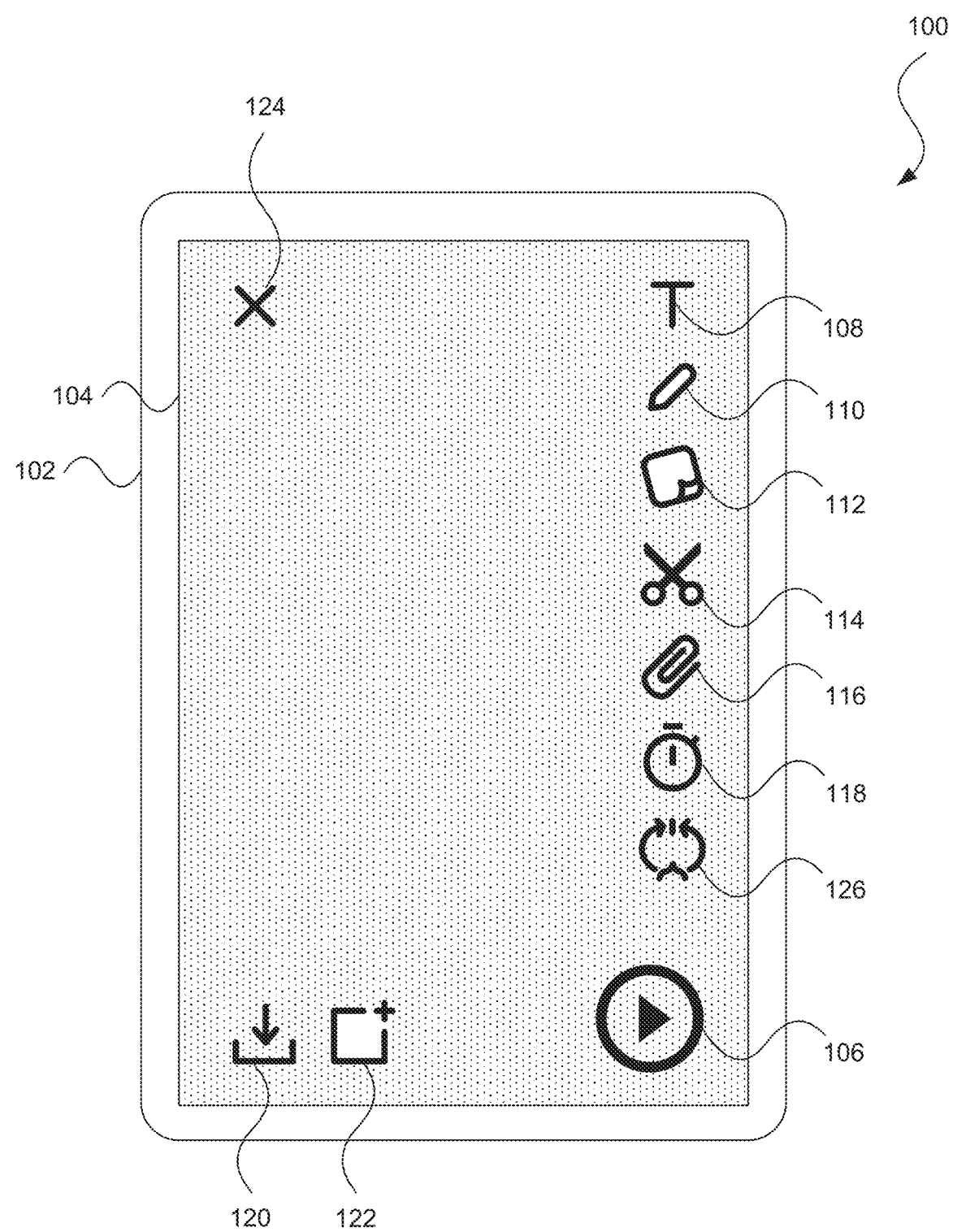
FIGS. 1A and 1B illustrate examples of graphical user interfaces for editing a video clip in accordance with an embodiment.

Systems and methods in accordance with various embodiments of the present disclosure may overcome one or more of the aforementioned and other deficiencies experienced in conventional approaches for editing a video on computing devices (e.g., servers, workstations, desktops, laptops, tablets, smart phones, media players, wearable devices, etc.). In some embodiments, a computing device can receive a video, such as by a camera built into the computing device capturing the video or the computing device receiving the video from another electronic device (e.g., as an attachment to an electronic message, as a download from a remote storage source, as a transferred file from a USB device, etc.). The computing device can display a graphical user interface (GUI) for editing the video, such as to add, edit, and/or remove text, drawings, virtual objects (e.g., stickers, Bitmoji, emoticons, etc.), uniform resource locators (URLs), and/or other data to the video.

In some embodiments, the GUI can also allow the computing device to incorporate certain cuts, transitions, or other video effects, such as dissolves (e.g., fade-ins and fade-outs), wipes (e.g., a video frame or set of video frames replacing another frame or set of frames by traveling from one side of the frame to another or with a special shape), close-ups and long shots, L-cuts and J-cuts (e.g., an audio segment playing before the matching video and vice versa), and other types of edits into the video or a portion of the video. In one embodiment, the GUI can include user interface elements for selecting a clip of the video and re-sampling the clip using one or more sampling patterns to generate a new clip. For example, the GUI can include a video scrubber (sometimes also referred to as a video slider) comprising a selection bar and a selection slider (sometimes also referred to as a handle). The selection bar may represent the full length of the video, and the selection slider may represent the portion of the video (or video clip) which the computing device applies a specific cut, transition, or other video effect (e.g., a sampling pattern). The computing device can compute one or more histograms that define the number of frames of the original clip to sample over various time intervals to generate the new video clip. In addition or alternatively, the computing device can identify the function y=f(x) corresponding to the sampling pattern(s), where y can represent the number of frames to sample and x can represent time. The computing device can calculate the area between the line or curve of the function f(x) and the x-axis to determine the number of frames y of the original clip to sample to create the new video clip. The computing device can play the new clip as a preview of how another computing device may present the new clip. The computing device can also generate other previews by applying the cut, transition, or other video effect to a different segment of the video when the selection slider moves to a different location along the selection bar. In addition, the computing device can send the new clip to other computing devices. In this manner, the computing device can provide for advanced video editing techniques using a minimal number of gestures and other inputs. The present disclosure describes various other functions and advantages below in accordance with the various embodiments.

Figure 1B:
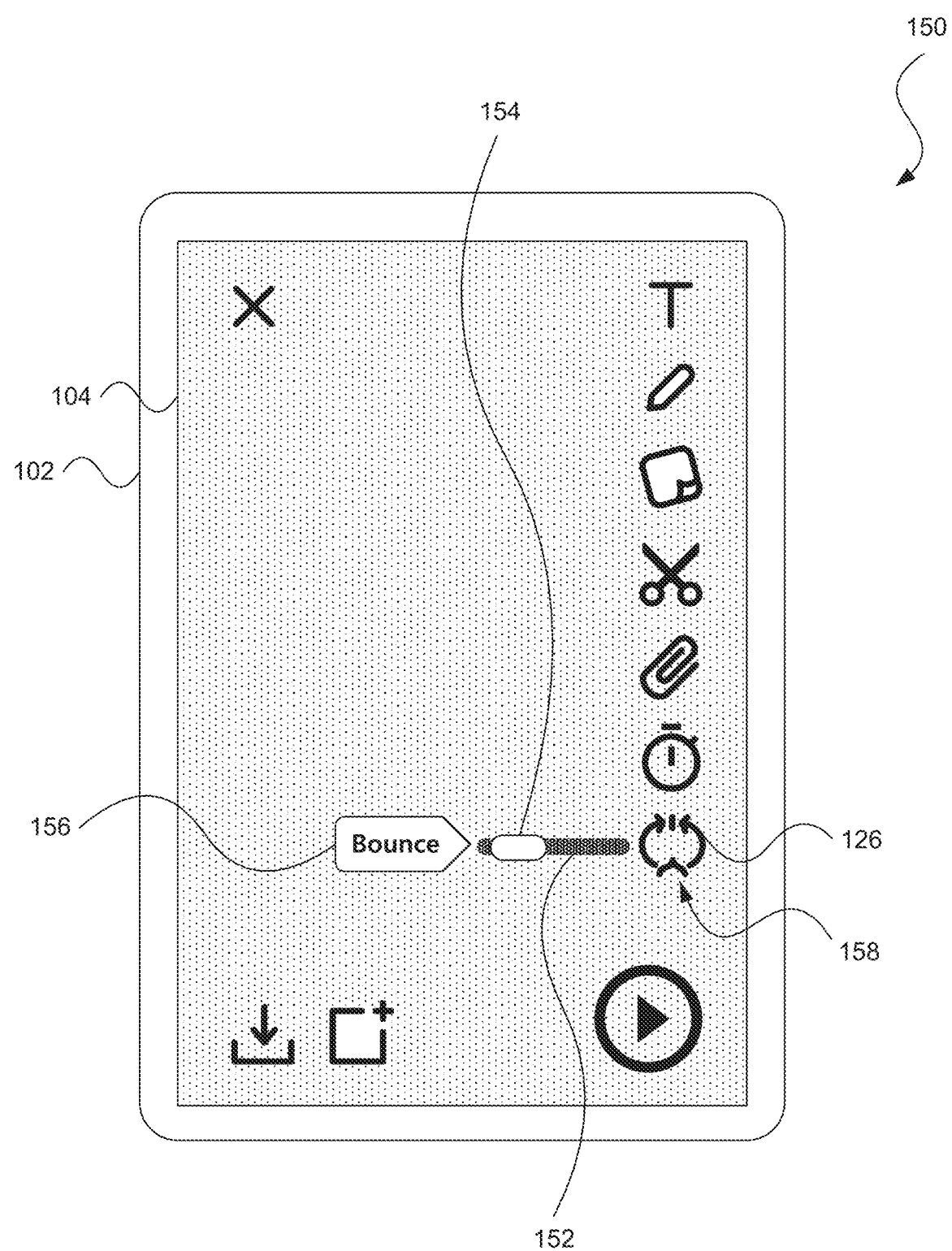

FIGS. 1A and 1B show examples of graphical user interfaces 100 and 150, respectively, of a camera application executing on computing device 102 and displayed on touchscreen 104. Graphical user interfaces 100 and 150 are but one example of a set of user interfaces for providing advanced video editing techniques and other embodiments may include fewer or more elements. For example, other embodiments may utilize user interfaces without graphical elements (e.g., a voice user interface). An example of an implementation of the camera application is SNAPCHAT® provided by SNAP™ Inc. of Los Angeles, Calif. but the present disclosure may also be applicable to social media and social networking applications, instant messengers, file sharing and file hosting services, video conferencing and web conferencing applications, and team collaboration tools, among others.

In this example, the camera application may present graphical user interface 100 in response to computing device 102 capturing a video or computing device 102 receiving the video from another electronic device and opening the video within the camera application, an electronic communication client application (e.g., email client, Short Message Service (SMS) text message client, instant messenger, etc.), a web browser/web application, a file manager or other operating system utility, a database, or other suitable application. Graphical user interface 100 includes video icon 106 which may indicate a state of the camera application, such as the camera application currently operating in a video editing mode. In some embodiments, video icon 106 may also be associated with an interface for sending the video, a portion of the video, an edited version of the video, or an edited clip of the video to local storage, remote storage, and/or other computing devices.

Graphical user interface 100 also includes various icons that may be associated with specific functions or features of the camera application, such as text tool icon 108, drawing tool icon 110, virtual object editor icon 112, scissors tool icon 114, paperclip tool icon 116, and timer icon 118, save tool icon 120, add tool icon 122, and exit icon 124. Selection of text tool icon 108, such as by computing device 102 receiving a touch or tap from a physical pointer or a click from a virtual pointer, can cause computing device 102 to display a text editing interface to add, remove, edit, format (e.g., bold, underline, italicize, etc.), color, and resize text and/or apply other text effects to the video. In response to receiving a selection of drawing tool icon 110, computing device 102 can present a drawing editor interface for selecting different colors and brush sizes for drawing in the video; adding, removing, and editing drawings in the video; and/or applying other image effects to the video.

Scissors tool icon 114 can be associated with a cut, copy, and paste interface for creating "stickers" or virtual objects that computing device 102 can incorporate into the video. In some embodiments, scissors tool icon 114 can also be associated with features such as "Magic Eraser" for deleting specified objects in the video, "Tint Brush" for painting specified objects in different colors, and "Backdrop" for adding, removing, and/or editing backgrounds in the video. Paperclip tool icon 116 can be associated an interface for attaching websites (e.g., URLs), search queries, and similar content in the video. Timer icon 118 can be associated with an interface for setting how long the video can be accessible to other users. Save tool icon 120 can be associated with an interface for saving the video to a personal or private repository of photos, images, and other content (referred to as "Memories" in the Snapchat application). Add tool icon 122 can be associated with an interface for adding the video to a shared repository of photos, images, and other content (referred to as "Stories" in the Snapchat application). Selection of exit icon 124 can cause computing device 102 to exit the video editing mode and to present the last user interface navigated to in the camera application.

Graphical user interface 100 also includes video presentation mode icon 126 for changing the manner of how the camera application presents the video. For instance, the camera application may support video presentation modes such as a "Play Once" mode in which the camera application may play the video one time, a "Loop" mode in which the camera application may continuously play the video in a loop, and an "Enhanced Clip" mode in which the camera application may edit a specified segment of the video (or video clip) to sample the segment according to one or more sampling patterns and play the segment. In an embodiment, the camera application may switch between these different presentation modes depending on the number of times computing device 102 detects selection of video presentation mode icon 126. For example, the camera application may initially present the video in "Play Once" mode and on every third selection of video presentation mode icon 126 thereafter, present the video in "Loop" mode after the first selection of video presentation mode icon 126 and every third selection thereafter, and present the video in "Enhanced Clip" mode after the second selection of video presentation mode icon 126 and every third selection thereafter.

FIG. 1B shows graphical user interface 150, which computing device 102 may display upon the camera application entering the "Enhanced Clip" video presentation mode. Graphical user interface 150 includes selection bar 152 for representing the video and selection slider 154 for representing the video clip from which the camera application samples to generate the special cut, transition, or other video effect. The left side of selection slider 154 can mark the beginning of the video clip and the right side of selection slider 154 can mark the end of the video clip. In some embodiments, the length of selection bar 152 may correspond to the full length of the video and the length of selection slider 154 may correspond to the length of the video clip. For example, if the full length of the video is 4 s and the length of the video clip is 2 s, then selection slider 154 would be 50% in length relative to the length of selection bar 152. In some embodiments, the camera application may specify a single value for the length of the video clip (e.g., 1.5 s, 2 s, 3 s, etc.). In other embodiments, the camera application can provide a default length for the video clip but may enable customization of the video clip length via a selection of a predetermined length, such as an absolute value (e.g., 2.5 s) or a relative value (e.g., 25% of the full length), from a set of predetermined lengths not exceeding the full length of the video, an alphanumeric input not less than zero and not exceeding the full length of the video, a touch gesture with respect to selection slider 154 (e.g., a pinching/un-pinching gesture to resize selection slider 154), a voice command, and/or a combination of these approaches and/or other gestures/inputs.

Graphical user interface 150 also includes label 156 for representing the sampling pattern(s) the camera application will apply to the original clip to create the new video clip. In some embodiments, video presentation mode icon 126 may include graphic 158 to represent the sampling pattern (s). In other embodiments, label 156 may incorporate graphic 158 or the camera application may display graphic 158 elsewhere within graphical user interface 150. In this example, the "Enhanced Clip" mode involves applying the "Bounce" sampling pattern to the video clip corresponding to selection slider 154. Applying the Bounce effect to the video clip simulates the clip bouncing back and forth in a curve-eased, speed-ramped loop. In an embodiment, the camera application can sample the video clip at a rate that results in speeding up the first half of the new clip up to 65% of the length of the original clip and sampling the original clip in reverse at the same sped-up rate to form a loop such that the full length of the new clip is 130% of the length of the original clip.

Figure 2A:
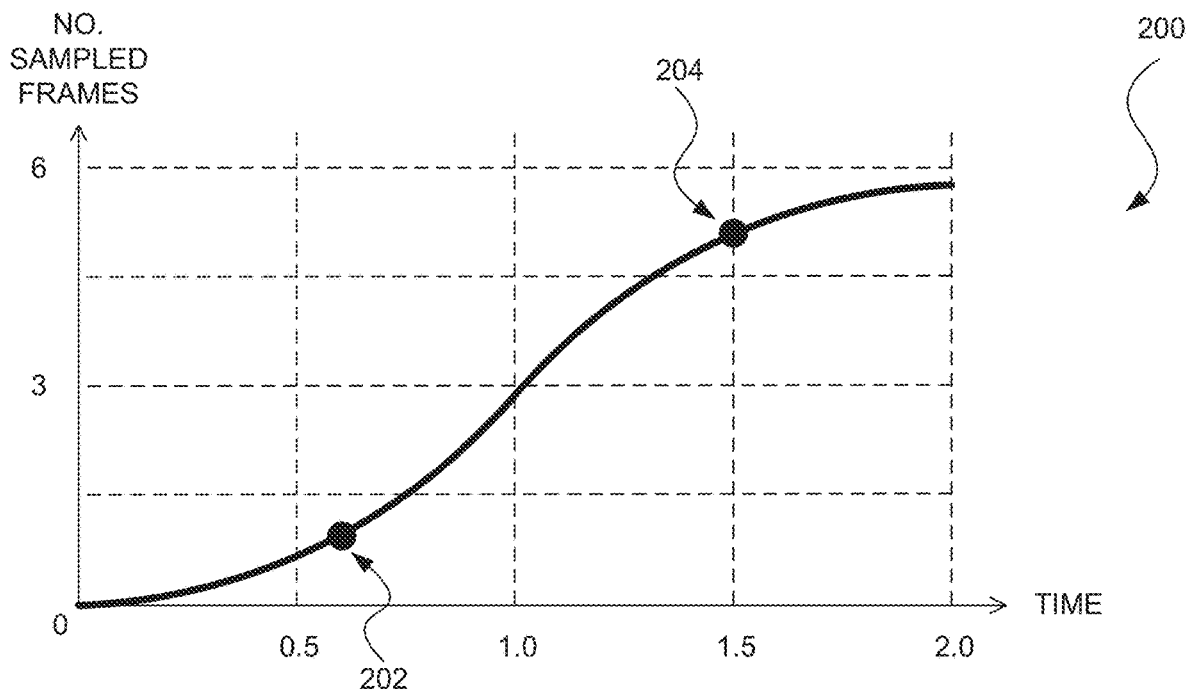
FIGS. 2A, 2B, and 2C illustrate examples of sampling patterns that a computing device can apply to a video clip in accordance with an embodiment.
Figure 2B:
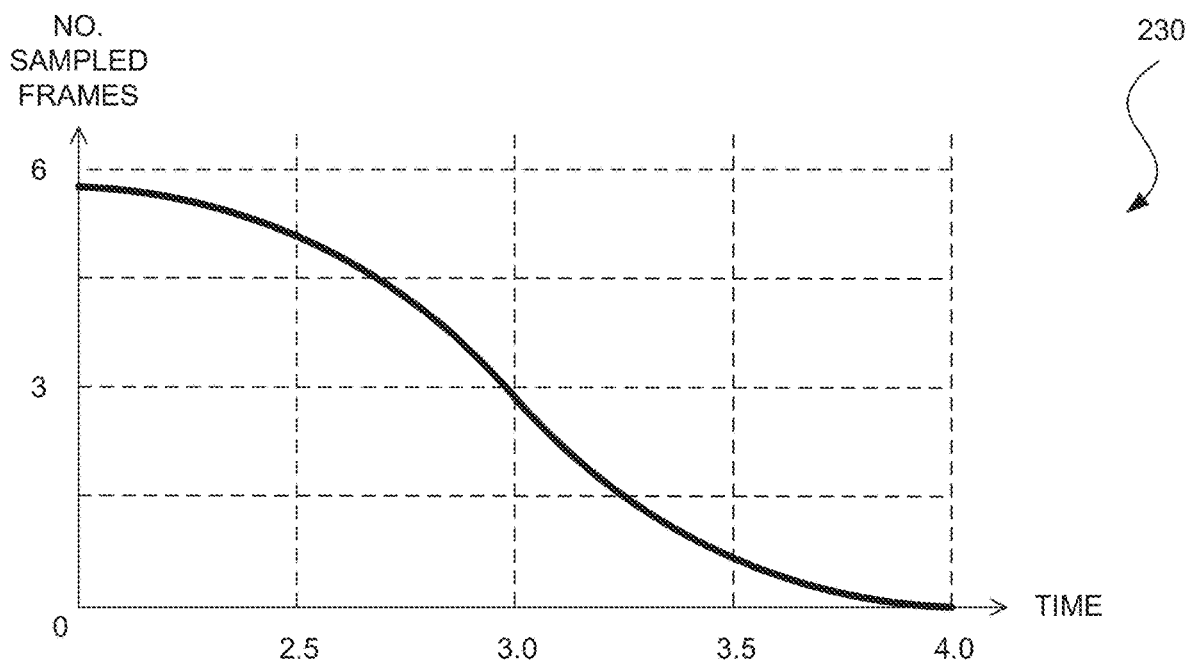
Figure 2C:
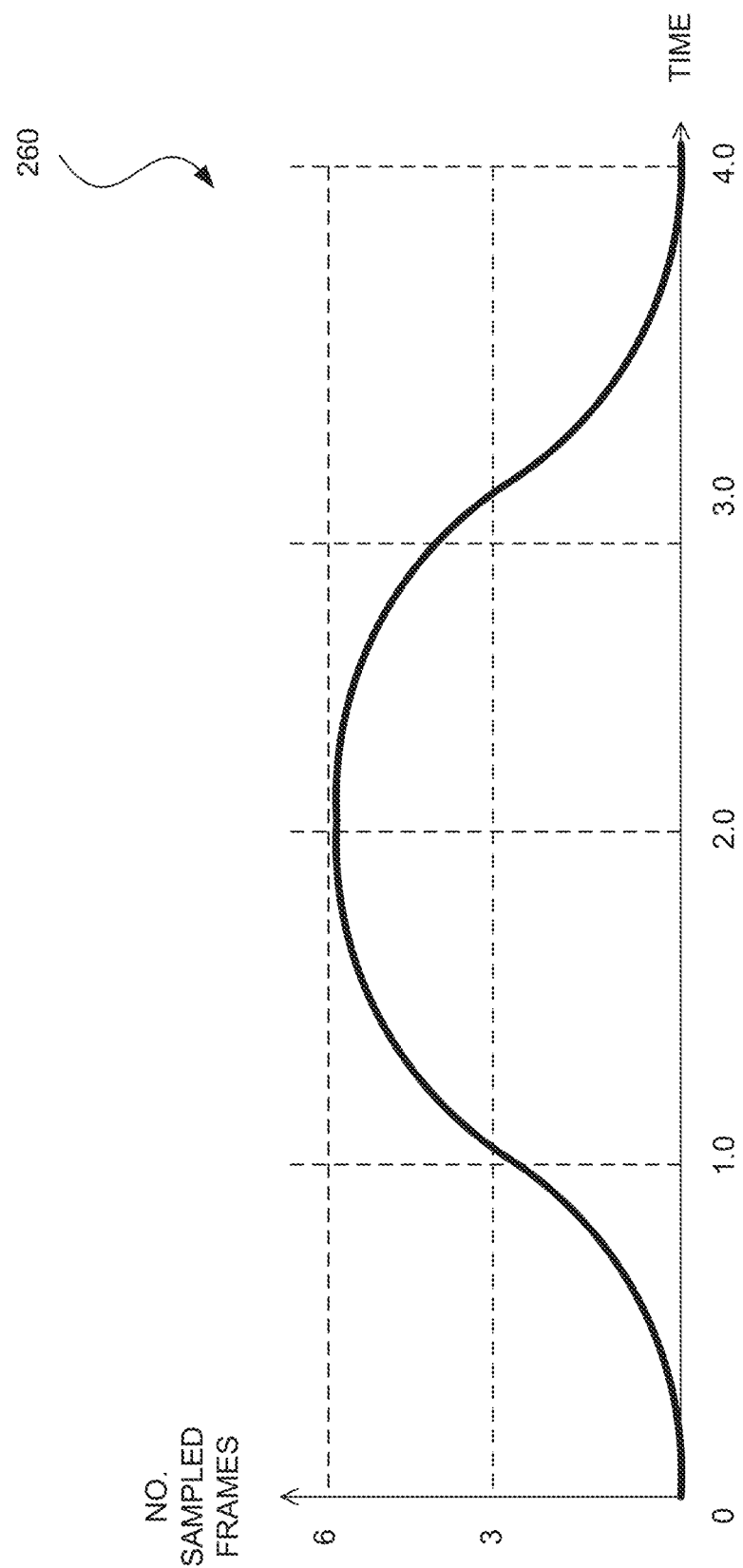

In traditional speed ramping, a conventional video editor drops frames (to simulate speeding up a portion of a video) or adds frames (to simulate slowing down a portion of the video) and samples the video at a constant rate to achieve a linear increase or decrease in speed, respectively. In the example of FIG. 1B, however, the camera application may sample the original clip at a non-linear rate consistent with a specified sampling pattern. FIGS. 2A, 2B, and 2C illustrate examples of sampling patterns the camera application can apply to the original video clip to generate the new video clip. In particular, FIG. 2A shows front-half 200 of the sampling pattern, FIG. 2B shows back-half 230 of the sampling pattern, and FIG. 2C shows the entirety of sampling pattern 260. In these examples, the x-axes represent time and the y-axes represent the number of frames to sample from the original clip to create the new video clip. For example, if the original clip has a standard frame rate (e.g., 30 frames per second (fps)), and the front half of the new clip is the same length as the original clip but sampled according to front-half 200, then the camera application can generate the portion of the new clip from t=0.5 s to t=0.6 s by taking one sample from the original clip over this same time period (or subsampling/downsampling the original clip) because the value of front-half 200 of the sampling pattern from t=0.5 s to t=0.6 s (e.g., point 202) is approximately 1. Using similar reasoning, the camera application can generate the portion of the front-half of the new clip from t=1.4 s to t=1.5 s by taking 5 samples from the original clip, including if necessary, repeating some of the frames and/or merging a pair of the frames (or interpolating the original clip) because the value of front-half 200 of the sampling pattern from t=1.4 s to t=1.5 s (e.g., point 204) is approximately 5. In some embodiments, prior to sampling, subsampling/downsampling, and/or upsampling/interpolating frames of the original clip to generate a portion of the new clip, the camera application may remove duplicate (or de-duplicate or de-dupe) frames of the original clip. This can result in a smoother transition between frames and/or provide a more interesting visual effect because there may be more differences from frame-to-frame.

The units of time (e.g., tenths of seconds) used in the above example are illustrative and other embodiments may use smaller units of time (e.g., milliseconds, microseconds, etc.) or greater units of time (e.g., seconds, minutes, etc.). In addition, other embodiments may use videos having a smaller frame rate (e.g., 24 fps) while still other embodiments may use videos having greater frame rates (e.g., 48 fps, 60 fps, 120 fps, 240 fps, etc.). In some embodiments, the camera application may also enable customization of the frame rate for the new clip.

Figure 3A:
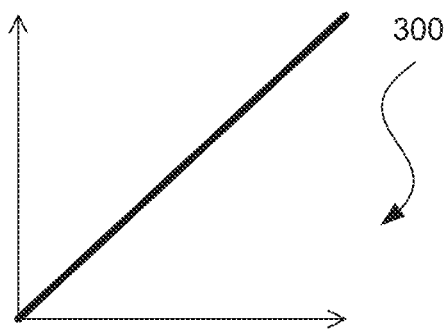
FIGS. 3A, 3B, 3C, 3D, 3E, and 3F illustrate examples of sampling patterns that a computing device can apply to a video clip in accordance with an embodiment.
Figure 3B:
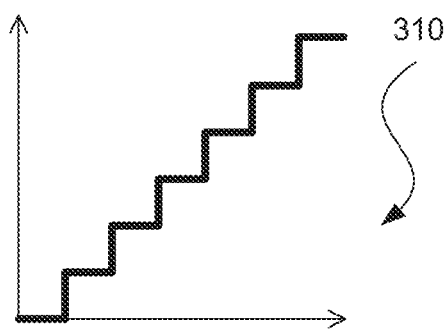

In the example of FIGS. 2B and 2C, back-half 230 of sampling pattern 260 is symmetrical to front-half 200. Other embodiments may use different speeds (e.g., 35% of the original clip) and/or different sampling patterns for the middle or back portion(s) of sampling pattern 260. FIGS. 3A-3F illustrate various examples of sampling patterns that the camera application can utilize for the first portion, middle portion(s), and/or last portion of sampling pattern 260. In particular, FIG. 3A shows sampling pattern 300, a linear function (e.g., f(x)=x); FIG. 3B shows sampling pattern 310, a step function (e.g., $$f(x) = \sum_{i=0}^{n} \alpha_i \chi_{A_i(x)}$$

for all real numbers x, where n≥0, $\alpha_i$ are real numbers, $A_i$ are intervals, and $\chi_i$ is the indicator function of $$A : \chi_A(x) = \begin{Bmatrix} 1 \text{ if } x \in A, \\ 0 \text{ if } x \in A \end{Bmatrix};$$

Figure 3C:
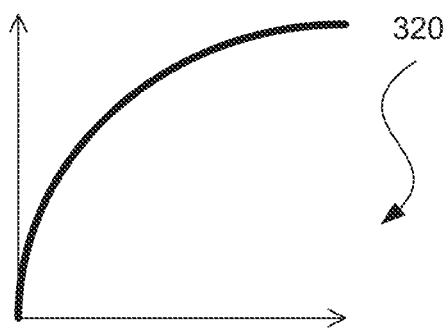
Figure 3D:
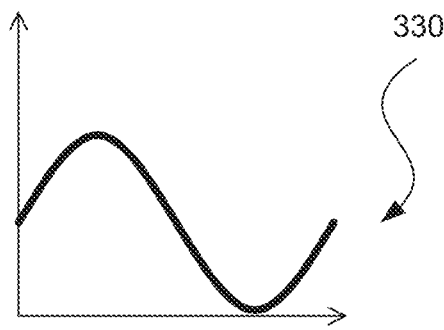
Figure 3E:
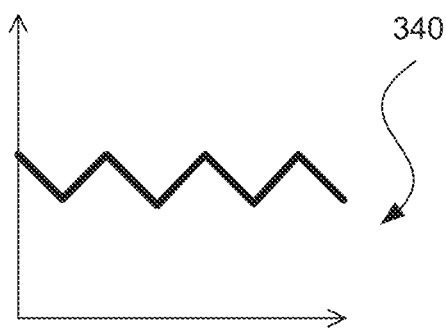
Figure 3F:
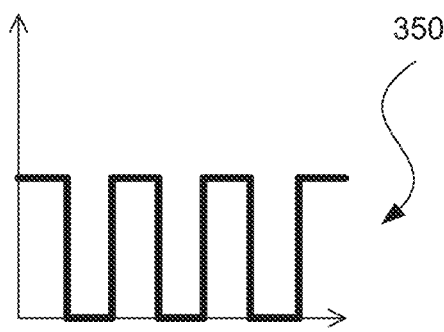

FIG. 3C shows sampling pattern 320, a square root function (e.g., f(x)=√x); FIG. 3D shows sampling pattern 330, a sinusoidal function (e.g., f(x)=sin x); FIG. 3E shows sampling pattern 340, a triangle wave (e.g., $$f(x) = \frac{8}{\pi^2} \sum_{n=1,3,5,\ldots}^{\infty} \frac{(-1)^{(n-1)/2}}{n^2} \sin\left(\frac{n\pi x}{L}\right),$$

with period 2L); and FIG. 3F shows sampling pattern 350, a square wave (e.g., $$f(x) = \frac{4}{\pi} \sum_{n=1,3,5,\ldots}^{\infty} \frac{1}{n} \sin\left(\frac{n\pi x}{L}\right),$$

with period 2L). In various embodiments, camera application may use any number of sampling patterns and any types of sampling patterns.

Figure 4A:
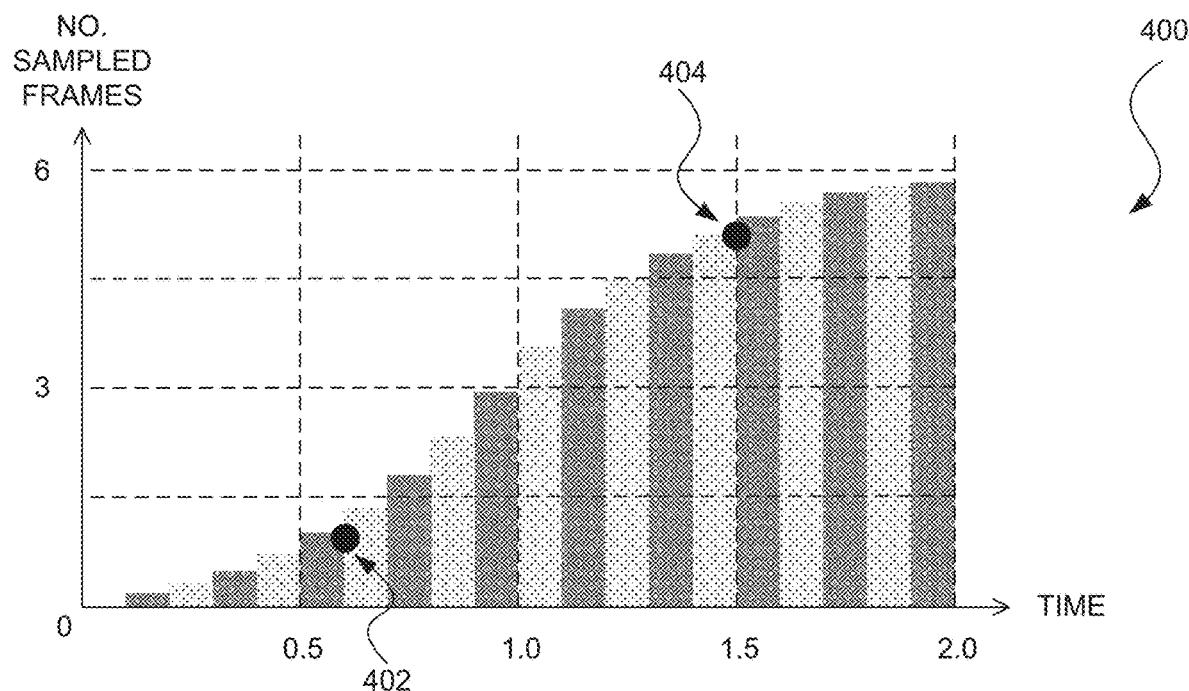
FIGS. 4A, 4B, and 4C illustrate examples of histograms a that a computing device can compute in accordance with an embodiment.
Figure 4B:
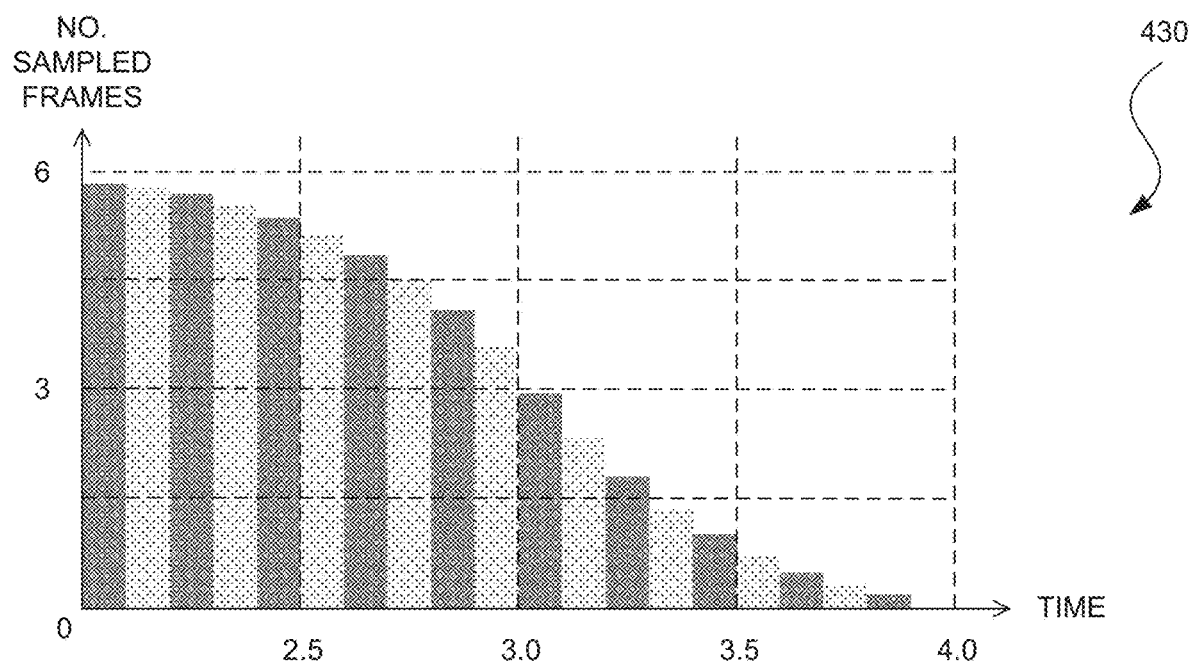
Figure 4C:
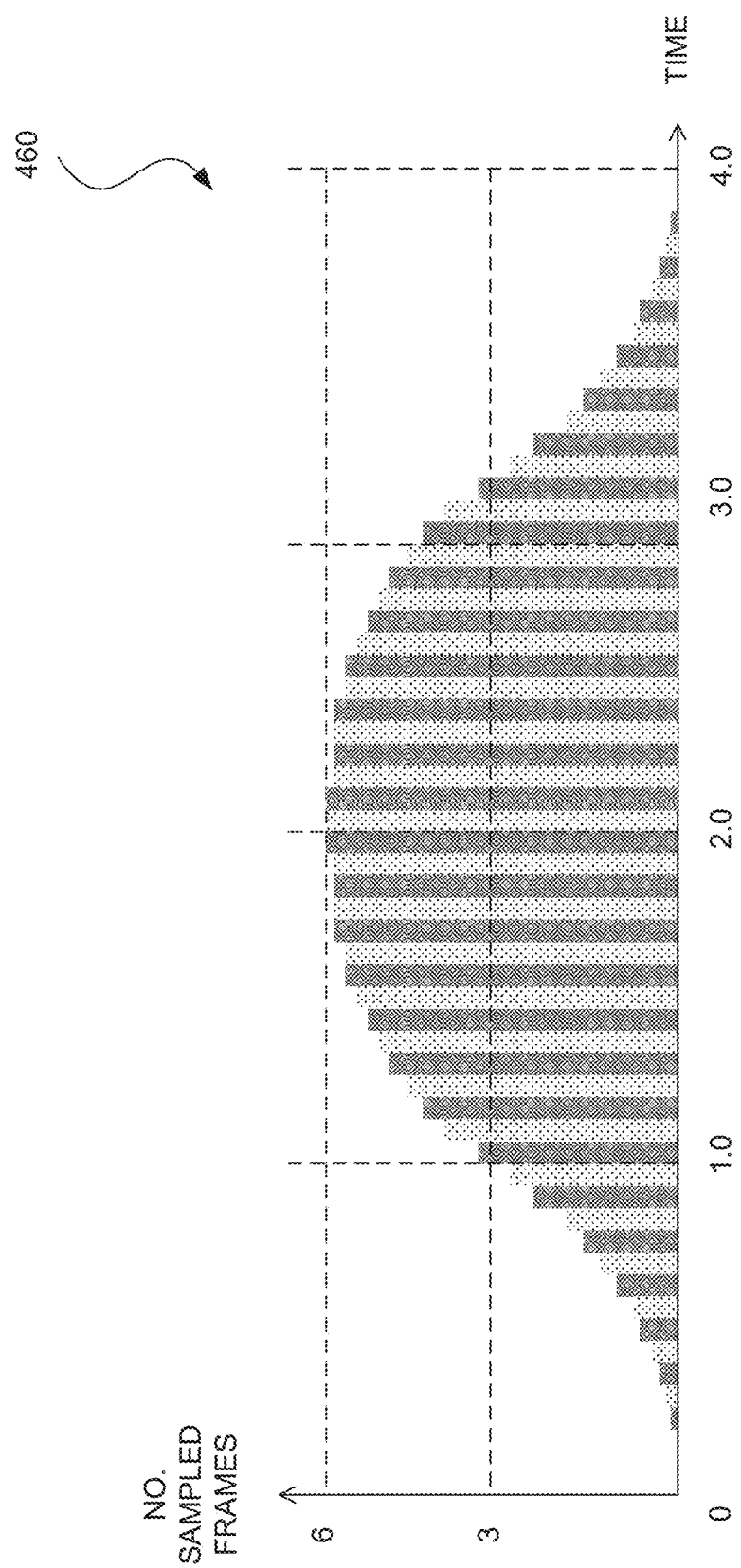

The camera application may use various approaches to apply a specified sampling pattern to the original clip to generate the new clip. In some embodiments, the camera application can determine the function y=f(x) where x represents time, and y represents the number of samples to extract from the original clip for creating the new clip. In other embodiments, the camera application can compute a histogram, such as shown in histograms 400, 430, and 460 of FIGS. 4A, 4B, and 4C, respectively. The camera application can evaluate the histogram at a particular interval to determine the number of frames to sample from the original clip for determining the corresponding interval of the new clip. For example, the camera application may sub-sample from a portion of the original clip to compute the corresponding portion in the new clip if the number of frames in the histogram is less than the frame rate of the original clip over the corresponding interval (such as at point 402).

Likewise, the camera application may interpolate frames of the original clip (e.g., repeat frames, merge pairs of frames, etc.) to determine the corresponding portion in the new clip if the number of frames in the histogram is greater than the frame rate of the original clip over the corresponding interval (such as at point 404). In still other embodiments, the camera application can determine the number of frames to sample from the original clip as the area between the function f(x) corresponding to sampling pattern 260 and the x-axis. In other words, the number of frames to sample from the original clip over interval x to x' is the definite integral of the function f(x) between x and x' (e.g., $\int_x^{x'} f(x)\, dx$). In some embodiments, the camera application may also alter the new clip by speeding up or slowing down the original clip by a factor k. For example, k=½ speeds up the original clip by factor of 2 or by 100% or shortens the length of the new clip by a factor of 2 or by 100% while k=3 slows down the original clip by a factor of 3 or by 200% or lengthens the length of the new clip by a factor of 3 or by 200%. In some embodiments, the camera application may de-duplicate frames of the original clip prior to sampling, subsampling/downsampling, and/or upsampling/interpolating frames of the original clip. As discussed, this can simulate a smoother transition between frames of the new clip and/or provide more noticeable differences between the frames.

Returning to FIG. 1B, some embodiments may allow for customization of the sampling pattern to apply to a selected portion of a video (or a video clip). For example, when computing device 102 detects a continuous touch of label 156 for a predetermined period of time (e.g., 2.5 s), the computing device may display a user interface element for selecting a different sampling pattern (e.g., a selection list) and/or to display a new user interface or user interface element for receiving a drawing of a new sampling pattern. In addition or alternatively, the camera application may include a settings interface for customizing various parameters for editing a video clip. These parameters may include a length of the video clip as discussed elsewhere herein. The parameters may also include one or more sampling patterns to apply to the video clip. For example, the camera application may enable selection of a single sampling pattern that can operate as a front-half of the sampling pattern for the new video clip and the reverse of which may operate as a back-half of the sampling pattern for the new video clip as shown in FIGS. 2A, 2B, and 2C. As another example, camera application may allow for selection of two or more sampling patterns that the computing device can apply sequentially to the entirety of the original video clip to result in a new clip that is n*L in length of the original clip where n is the number of sampling patterns and L is the length of the original clip. As yet another example, the camera application may support selection of two or more sampling patterns that the computing device can apply to portions of the original video clip such that the sum of the lengths of each application of a selected sampling pattern to a portion of the original clip is equal to the sum of the original clip (e.g., $L=\Sigma(f(x)$ f or x=0 to $t_1$+g(x) for x=$t_2$ to $t_3$+ . . . )). In some embodiments, the camera application may also support customization of a presentation mode (e.g., playing the video clip once or in a loop), an adjustment factor for adjusting the length of a portion of the new clip corresponding to each sampling pattern relative to the length of the original clip, and the frame rate for the new clip.

Figure 5:
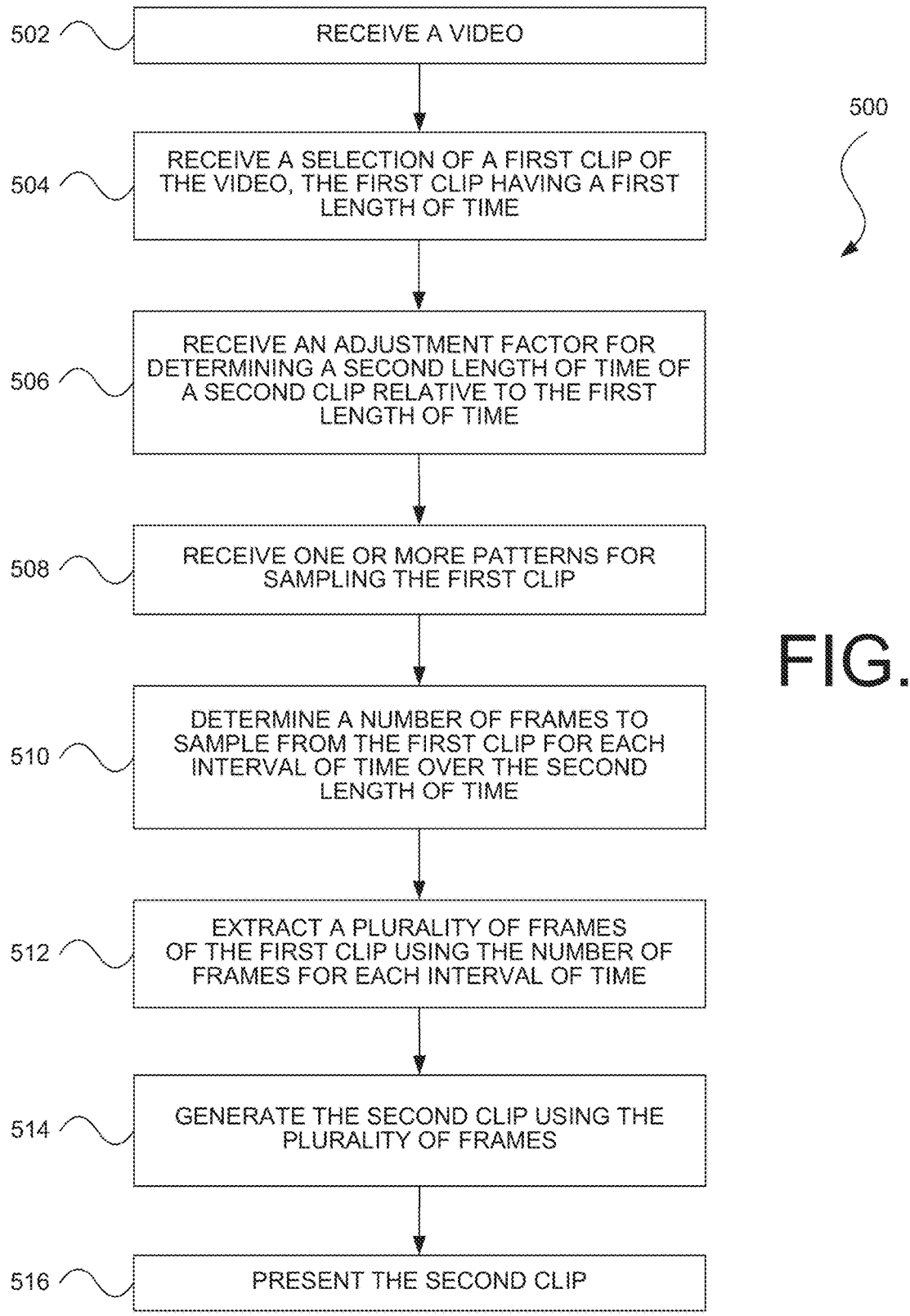
FIG. 5 illustrates an example of a process for editing a video clip from a sampling pattern in accordance with an embodiment.

FIG. 5 illustrates an example of a method, process 500, for editing a video clip by applying a sampling pattern to the clip to generate a new clip. For any process discussed herein, there can be additional, fewer, or alternative steps performed in similar or alternative orders, or in parallel, within the scope of various embodiments unless otherwise stated. A computing device, such as computing device 102 of FIGS. 1A and 1B, client devices 620 of FIG. 6, or computing system 1200 or devices 1220 of FIG. 12, and more particularly, an application (e.g., camera application 1134 of FIG. 11) executing on the computing device may perform process 500. Process 500 may begin at step 502, in which the computing device receives a video or similar data (e.g., an ordered sequence of images). The computing device can receive the video from a built-in camera capturing the video or the computing device receiving the video from another device (e.g., as an attachment to an email or other electronic communication, as a download from the Internet, as a transmission over a local communication channel (e.g., Wi-Fi, Bluetooth, near field communication (NFC), etc.)).

Process 500 can proceed to step 504 in which the computing device receives a selection of a clip of the video. In an embodiment, the computing device may display a video scrubber for selecting the clip, such as shown in FIG. 2B, and/or other user interface elements (e.g., a pair of markers to mark the beginning and the end of the clip). In another embodiment, the computing device may select a clip by default (e.g., select a clip beginning at the start of the video) as well as support user customization of the clip length via gesture (e.g., pinching and un-pinching gesture with respect to selection slider 154), alphanumeric entry, voice command, or other suitable input. The computing device can also provide a settings interface to modify the clip length using one or more of these approaches. In addition, the clip length is not necessarily smaller than the received video. In some embodiments, the length of the selected clip may be equal to the length of the video.

At step 506, the computing device may receive one or more adjustment factors k for determining the length of the new clip relative to the length of the original clip. The computing device may select a default adjustment factor (e.g., k=1) but support customization of the adjustment factor(s). For example, k=¾ may speed up the original clip such that the length of the new clip is 75% of the length of the original clip while k=4 may slow down the original clip such that the length of the new clip is 4 times the length of the original clip. The computing device may apply the same adjustment factor or different adjustment factors if the computing device applies a sampling pattern to the original clip more than once. For example, in an embodiment, the computing device may use a first adjustment factor k=0.65 for a first half of the new clip and a second adjustment factor k=0.35 for a second half of the new clip.

At step 508, the computing device can receive one or more sampling patterns to apply to the selected video clip. The computing device may select a default sampling pattern, such as the Bounce pattern illustrated in FIG. 2C, but the computing device can also support selection of any number of other sampling patterns. For example, FIGS. 3A-3F illustrate various examples of sampling patterns that the computing device may apply to the original clip. In addition, the computing device may support importation of a new sampling pattern or provide a drawing interface for creating a new sampling pattern. The computing device may use any number of sampling patterns and may apply each sampling pattern to the entirety of the original clip, to a portion of the original clip, or both. For example, in an embodiment, the computing device may apply a first sampling pattern to the entirety of the original clip, a second sampling pattern to a first half of the original clip, and a third sampling pattern to a second half of the original clip.

Process 500 may continue to step 510 in which the computing device determines the number of frames to sample from the first clip for each interval of time over the length of the second clip. For example, if the first clip is 2 s in length with a frame rate of 30 fps, the computing device can divide the first clip into 60 1 s intervals and determine individual numbers (e.g., no number of frames for 0 to 1 s, $n_1$ number of frames from is to 2 s, $n_2$ number of frames from 2 s to 3 s, etc.) to sample from the first clip to determine the frames for the second clip.

An approach for determining the numbers of frames to extract from the original clip is for the computing device to determine the function y=f(x) corresponding to the sampling pattern, where x represents time and y represents the number of frames to sample. The computing device can determine the number of frames to sample by evaluating f(x) for each value of x (e.g., increments of 0.01 s, 0.05 s, 0.1 s, 1 s, etc.).

Another approach for determining the frames to retrieve from the original clip can involve the computing device generating a histogram corresponding to the sampling pattern and evaluating the histogram per unit of time. In some embodiments, the sum of every bin of the histogram is equal to a product of the frame rate of the new clip and a length of the new clip (and possibly an adjustment factor for lengthening or shortening the length of the new clip relative to the length of the original clip). For example, given histogram 400 of FIG. 4A, a frame rate of 30 fps for the new clip, 2 s for the length of the new clip, and k=1, the computing device can generate the portion of the new clip from t=0.5 s to t=0.6 s by taking one sample from the original clip over this same time period (or subsampling the original clip), and the computing device can generate the portion of the new clip from t=1.4 s to t=1.5 s by taking 5 samples from the original clip, including if necessary, repeating some of the frames and/or merging a pair of the frames (or interpolating the original clip). Yet another approach for determining the number of frames to sample from the original sampling pattern is to determine the definite integral of f(x) (e.g., $y = \int_x^{x'} f(x) \, dx$)) and solve for y per unit of time.

At step 512, the computing device can extract frames of the original clip using the number of frames to sample determined in step 510. Then, at step 514, the computing device can assemble the new clip from the frames extracted from the original clip. This can include subsampling frames of the original clip during intervals in which the evaluation of f(x), the histogram, the definite integral of f(x), or other suitable approach indicates that the number of frames to sample for the new clip is less than the number of available frames at the corresponding interval of the original clip. This can also include interpolating frames of the original clip (e.g., repeating frames, merging frames, etc.) during intervals in which the evaluation of f(x), the histogram, the definite integral of f(x), or other suitable approach indicates that the number of frames to sample for the new clip is greater than the number of available frames at the corresponding interval of the original clip.

Process 500 may conclude at step 514 in which the computing device presents the new clip, such as to provide a preview of the new clip by displaying the new clip on a display screen of the computing device. In some embodiments, the computing device may also send the new clip to one or more other computing devices, such as devices associated with friends and other contacts of the user associated with the computing device. In some embodiments, the computing device may send the entire video to the other computing device(s) and metadata for recreating the new clip on the other device(s) (e.g., clip start time, clip end time and/or clip length, clip frame rate, one or more sampling patterns, sampling order for each sampling pattern (e.g., forward sampling or reverse sampling), the order to apply the sampling patterns, one or more adjustment factors for adjusting the length of a portion of the new clip corresponding to each sampling pattern relative to the length of the original clip, etc.). This can enable the other computing device to display the new clip as intended by the user associated with the first computing device but also allow the users of the other computing devices to generate their own clips from the original video.

Figure 6:
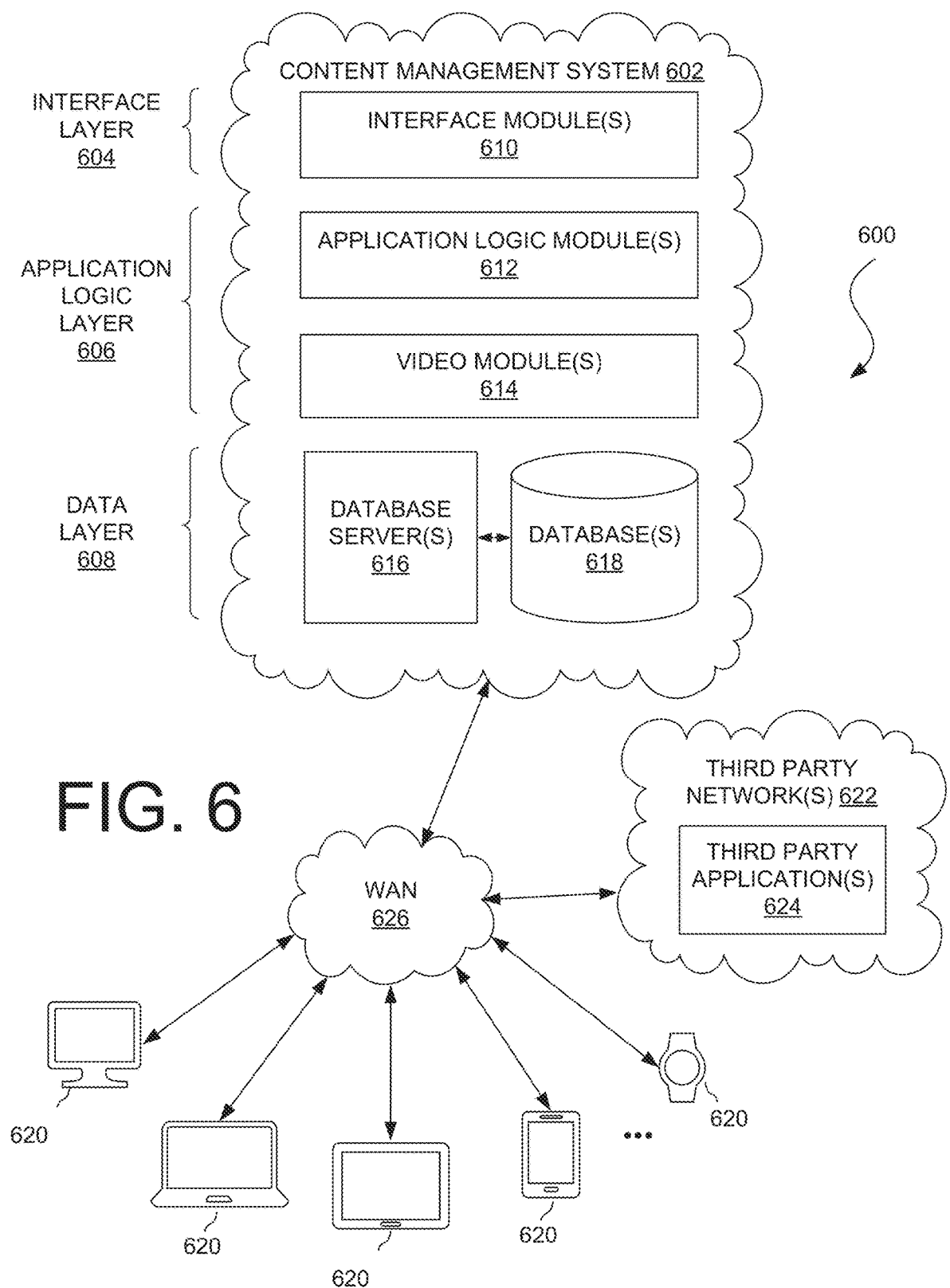
FIG. 6 illustrates an example of a network environment in accordance with an embodiment.

FIG. 6 shows an example of a system, network environment 600, in which various embodiments of the present disclosure may be deployed. For any system or system element discussed herein, there can be additional, fewer, or alternative components arranged in similar or alternative orders, or in parallel, within the scope of the various embodiments unless otherwise stated. Although network environment 600 is a client-server architecture, other embodiments may utilize other network architectures, such as peer-to-peer or distributed network environments.

In this example, network environment 600 includes content management system 602. Content management system 602 may based on a three-tiered architecture that includes interface layer 604, application logic layer 606, and data layer 608. Each module or component of network environment 600 may represent a set of executable software instructions and the corresponding hardware (e.g., memory and processor) for executing the instructions. To avoid obscuring the subject matter of the present disclosure with unnecessary detail, various functional modules and components that may not be germane to conveying an understanding of the subject matter have been omitted. Of course, additional functional modules and components may be used with content management system 602 to facilitate additional functionality that is not specifically described herein. Further, the various functional modules and components shown in network environment 600 may reside on a single server computer, or may be distributed across several server computers in various arrangements. Moreover, although content management system 602 has a three-tiered architecture, the subject matter of the present disclosure is by no means limited to such an architecture.

Interface layer 604 includes interface modules 610 (e.g., a web interface, a mobile application (app) interface, a restful state transfer (REST) application programming interface (API) or other API, etc.), which can receive requests from various client computing devices and servers, such as client devices 620 executing client applications (not shown) and third-party servers 622 executing third-party application(s) 624. In response to the received requests, interface modules 610 communicate appropriate responses to requesting devices via wide area network (WAN) 626 (e.g., the Internet). For example, interface modules 610 can receive requests such as HTTP requests, or other Application Programming Interface (API) requests.

Client devices 620 can execute web browsers or apps that have been developed for a specific platform to include any of a wide variety of mobile computing devices and mobile-specific operating systems (e.g., IOS™, ANDROID™, WINDOWS® PHONE). Client devices 620 can provide functionality to present information to a user and communicate via WAN 626 to exchange information with content management system 602.

In some embodiments, client devices 620 may include a camera app such as SNAPCHAT® that, consistent with some embodiments, allows users to exchange ephemeral messages that include media content, including video messages or text messages. In this example, the camera app can incorporate aspects of embodiments described herein. The ephemeral messages are deleted following a deletion trigger event such as a viewing time or viewing completion. In such embodiments, a device uses the various components described herein within the context of any of generating, sending, receiving, or displaying aspects of an ephemeral message.

Client devices 620 can each comprise at least a display and communication capabilities with WAN 626 to access content management system 602. Client devices 620 may include remote devices, workstations, computers, general purpose computers, Internet appliances, hand-held devices, wireless devices, portable devices, wearable computers, cellular or mobile phones, personal digital assistants (PDAs), smartphones, tablets, ultrabooks, netbooks, laptops, desktops, multi-processor systems, microprocessor-based or programmable consumer electronics, game consoles, set-top boxes, network PCs, mini-computers, and the like.

Data layer 608 includes database servers 616 that can facilitate access to information storage repositories or databases 618. Databases 618 are storage devices that store data such as member profile data, social graph data (e.g., relationships between members of content management system 602), and other user data and content data, such as videos, clips, sampling patterns, and the like.

Application logic layer 606 includes video modules 614, for supporting various video features discussed herein, and application logic modules 612, which, in conjunction with interface modules 610, can generate various user interfaces with data retrieved from various data sources or data services in data layer 608. Individual application logic modules 612 may be used to implement the functionality associated with various applications, services, and features of content management system 602. For instance, a camera application can be implemented using one or more application logic modules 612. The camera application can provide a messaging mechanism for users of client devices 620 to send and receive messages that include text and media content such as pictures and video. Client devices 620 may access and view the messages from the camera application for a specified period of time (e.g., limited or unlimited). In an embodiment, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 612.

Figure 7:
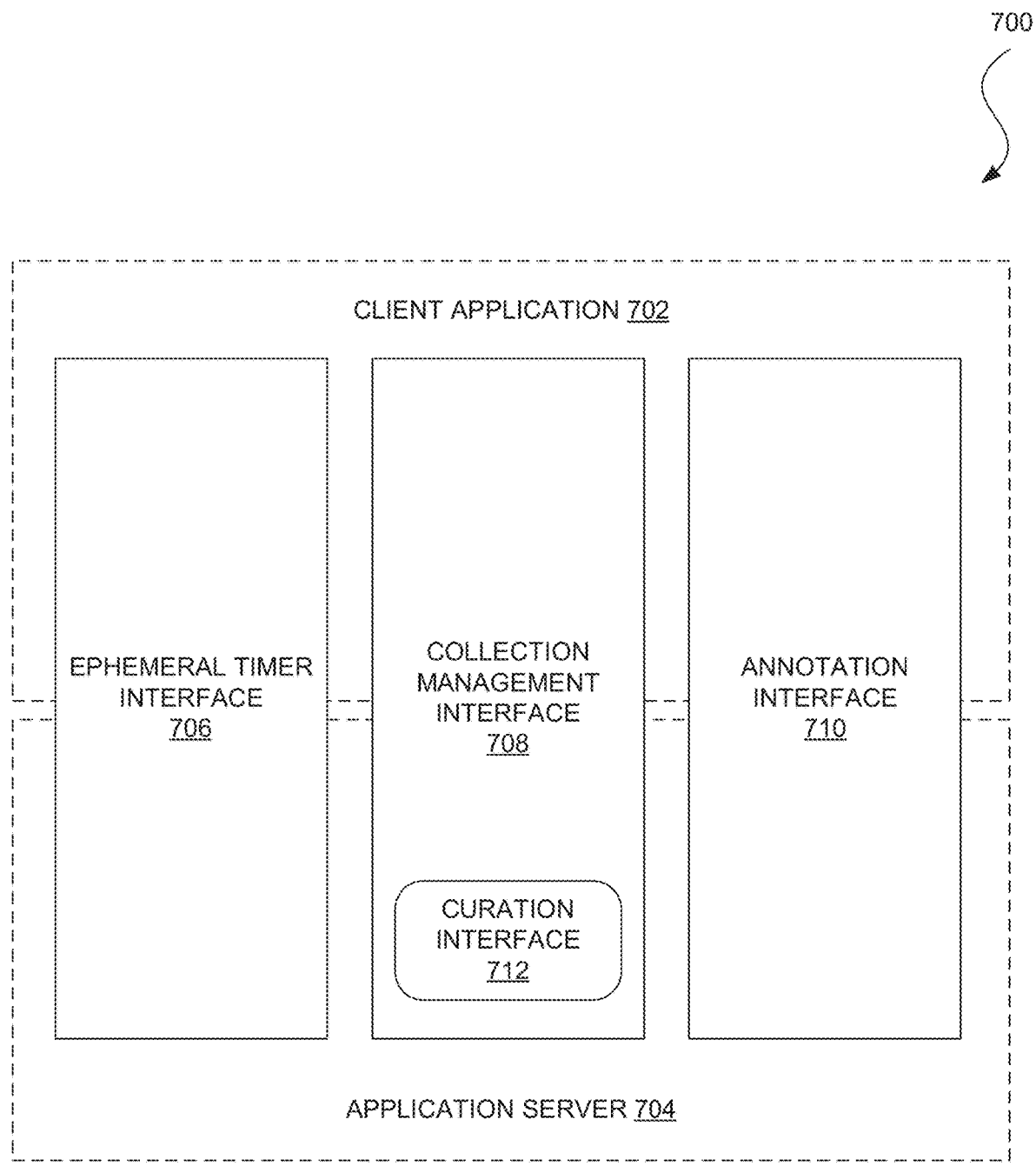
FIG. 7 illustrates an example of a content management system in accordance with an embodiment.

FIG. 7 shows an example of a content management system 700 including client application 702 (e.g., running on client devices 620 of FIG. 6) and application server 704 (e.g., an implementation of application logic layer 606). In this example, the operation of content management system 700 encompasses various interactions between client application 702 and application server 704 over ephemeral timer interface 706, collection management interface 708, and annotation interface 710.

Ephemeral timer interface 706 is a subsystem of content management system 700 responsible for enforcing the temporary access to content permitted by client application 702 and server application 704. To this end, ephemeral timer interface 1014 can incorporate a number of timers that, based on duration and display parameters associated with content, or a collection of content (e.g., messages, videos, a SNAPCHAT® story, etc.), selectively display and enable access to the content via client application 702. Further details regarding the operation of ephemeral timer interface 706 are provided below.

Collection management interface 708 is a subsystem of content management system 700 responsible for managing collections of media (e.g., collections of text, images, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. Collection management interface 708 may also be responsible for publishing an icon that provides notification of the existence of a particular collection to the user interface of client application 702.

In this example, collection management interface 708 includes curation interface 712 to allow a collection manager to manage and curate a particular collection of content. For instance, curation interface 712 can enable an event organizer to curate a collection of content relating to a specific event (e.g., delete inappropriate content or redundant messages). Additionally, collection management interface 708 can employ machine vision (or image recognition technology) and content rules to automatically curate a content collection. In certain embodiments, compensation may be paid to a user for inclusion of user generated content into a collection. In such cases, curation interface 712 can automatically make payments to such users for the use of their content.

Annotation interface 710 is a subsystem of content management system 700 that provides various functions to enable a user to annotate or otherwise modify or edit content. For example, annotation interface 710 may provide functions related to the generation and publishing of media overlays for messages or other content processed by content management system 700. Annotation interface 710 can supply a media overlay (e.g., a SNAPCHAT® filter) to client application 702 based on a geolocation of a client device. As another example, annotation interface 710 may supply a media overlay to client application 702 based on other information, such as, social network information of the user of the client device. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device. For example, the media overlay including text that can be overlaid on top of a photograph generated taken by the client device. In yet another example, the media overlay may include an identification of a location overlay (e.g., Venice beach), a name of a live event, or a name of a merchant overlay (e.g., Beach Coffee House). In another example, annotation interface 710 can use the geolocation of the client device to identify a media overlay that includes the name of a merchant at the geolocation of the client device. The media overlay may include other indicia associated with the merchant. The media overlays may be stored in a database (e.g., database 618 of FIG. 3) and accessed through a database server (e.g., database server 616).

In an embodiment, annotation interface 710 can provide a user-based publication platform that enables users to select a geolocation on a map, and upload content associated with the selected geolocation. The user may also specify circumstances under which a particular media overlay should be offered to other users. Annotation interface 710 can generate a media overlay that includes the uploaded content and associates the uploaded content with the selected geolocation.

Figure 8:
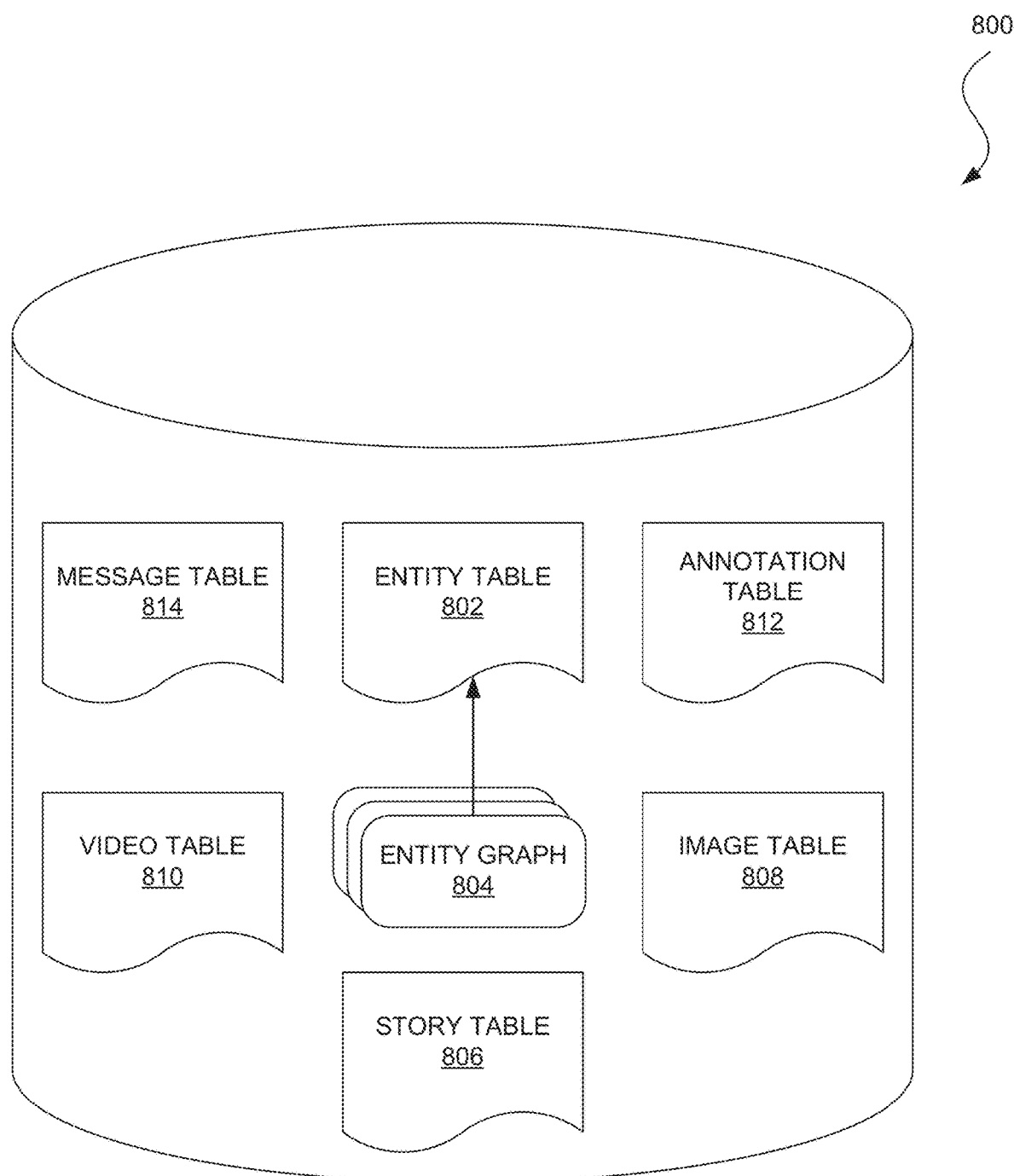
FIG. 8 illustrates an example of a data model for a content management system in accordance with an embodiment.

In another embodiment, annotation interface 710 may provide a merchant-based publication platform that enables merchants to select a particular media overlay associated with a geolocation via a bidding process. For example, annotation interface 710 can associate the media overlay of a highest bidding merchant with a corresponding geolocation for a predefined amount of time FIG. 8 shows an example of data model 800 for a content management system, such as content management system 700. While the content of data model 800 is shown to comprise a number of tables, it will be appreciated that the data could be stored in other types of data structures, such as an object database, a non-relational or "not only" SQL (NoSQL) database, a highly distributed file system (e.g., HADOOP® distributed filed system (HDFS)), etc.

Data model 800 includes message data stored within message table 814. Entity table 802 stores entity data, including entity graphs 804. Entities for which records are maintained within entity table 802 may include individuals, corporate entities, organizations, objects, places, events, etc. Regardless of type, any entity regarding which the content management system 700 stores data may be a recognized entity. Each entity is provided with a unique identifier, as well as an entity type identifier (not shown).

Entity graphs 804 store information regarding relationships and associations between entities. Such relationships may be social, professional (e.g., work at a common corporation or organization), interested-based, activity-based, or based on other characteristics.

Data model 800 also stores annotation data, in the example form of filters, in annotation table 812. Filters for which data is stored within annotation table 812 are associated with and applied to videos (for which data is stored in video table 810) and/or images (for which data is stored in image table 808). Filters, in one example, are overlays that are displayed as overlaid on an image or video during presentation to a recipient user. Filters may be of various types, including user-selected filters from a gallery of filters presented to a sending user by client application 702 when the sending user is composing a message. Other types of filers include geolocation filters (also known as geo-filters) which may be presented to a sending user based on geographic location. For example, geolocation filters specific to a neighborhood or special location may be presented within a user interface by client application 702, based on geolocation information determined by a GPS unit of the client device. Another type of filer is a data filer, which may be selectively presented to a sending user by client application 702, based on other inputs or information gathered by the client device during the message creation process. Example of data filters include current temperature at a specific location, a current speed at which a sending user is traveling, battery life for a client device, the current time, or other data captured or received by the client device.

Other annotation data that may be stored within image table 808 can include "lens" data. A "lens" may be a real-time special effect and sound that may be added to an image or a video.

As discussed above, video table 810 stores video data which, in one embodiment, is associated with messages for which records are maintained within message table 814. Similarly, image table 808 stores image data associated with messages for which message data is stored in entity table 802. Entity table 802 may associate various annotations from annotation table 812 with various images and videos stored in image table 808 and video table 810.

Story table 806 stores data regarding collections of messages and associated image, video, or audio data, which are compiled into a collection (e.g., a SNAPCHAT® story or a gallery). The creation of a particular collection may be initiated by a particular user (e.g., each user for which a record is maintained in entity table 802) A user may create a "personal story" in the form of a collection of content that has been created and sent/broadcast by that user. To this end, the user interface of client application 702 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. In some embodiments, users whose client devices have location services enabled and are at a common location event at a particular time may be presented with an option, via a user interface of client application 702, to contribute content to a particular live story. The live story may be identified to the user by client application 702 based on his or her location. The end result is a "live story" told from a community perspective.

A further type of content collection is known as a "location story", which enables a user whose client device is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 9:
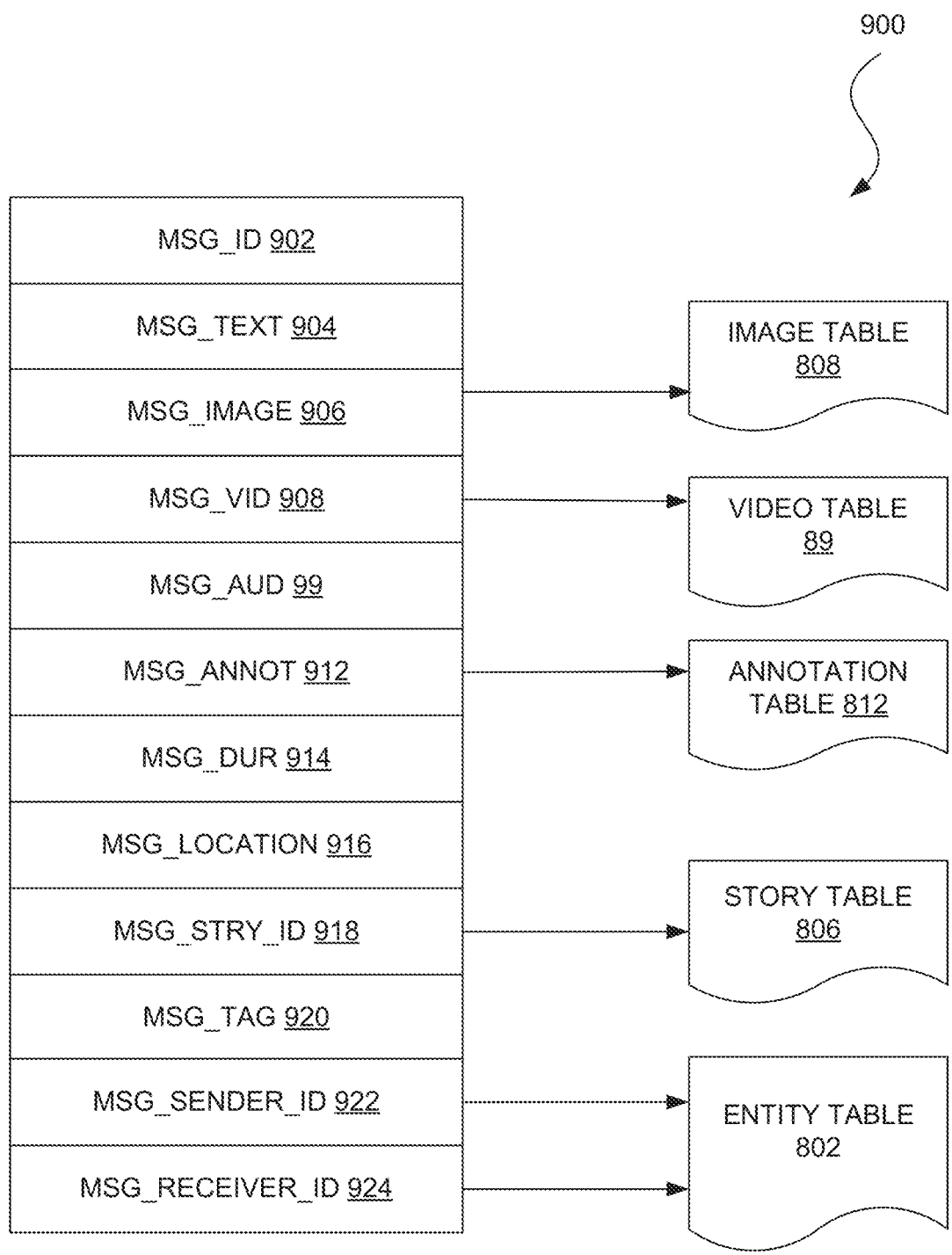
FIG. 9 illustrates an example of a data structure for a message in accordance with an embodiment.

FIG. 9 shows an example of a data structure of a message 900 that a first client application (e.g., client application 702 of FIG. 7) may generate for communication to a second client application or a server application (e.g., server application 704). The content of message 900 is used to populate the message table 814 stored within data model 800 and may be accessible by client application 702. Similarly, the content of message 900 is stored in memory as "in-transit" or "in-flight" data of the client device or application server. Message 900 is shown to include the following components:
  Message identifier 902: a unique identifier that identifies message 900;
  Message text payload 904: text, to be generated by a user via a user interface of a client device and that is included in message 900;
  Message image payload 906: image data, captured by a camera component of a client device or retrieved from memory of a client device, and that is included in message 900;
  Message video payload 908: video data, captured by a camera component or retrieved from a memory component of a client device and that is included in message 900;
  Message audio payload 910: audio data, captured by a microphone or retrieved from the memory component of a client device, and that is included in message 900;
  Message annotations 912: annotation data (e.g., filters, stickers or other enhancements) that represents annotations to be applied to message image payload 906, message video payload 908, or message audio payload 910 of message 900;

Message duration 914: a parameter indicating, in seconds, the amount of time for which content of the message (e.g., message image payload 906, message video payload 908, message audio payload 910) is to be presented or made accessible to a user via client application 702;

Message geolocation 916: geolocation data (e.g., latitudinal and longitudinal coordinates) associated with the content payload of the message. Multiple message geolocation parameter values may be included in the payload, each of these parameter values being associated with respect to content items included in the content (e.g., a specific image into within message image payload 906, or a specific video in message video payload 908);

Message story identifier 918: identifier values identifying one or more content collections (e.g., "stories") with which a particular content item in message image payload 906 of message 900 is associated. For example, multiple images within message image payload 906 may each be associated with multiple content collections using identifier values;

Message tag 920: each message 900 may be tagged with multiple tags, each of which is indicative of the subject matter of content included in the message payload. For example, where a particular image included in message image payload 906 depicts an animal (e.g., a lion), a tag value may be included within message tag 920 that is indicative of the relevant animal. Tag values may be generated manually, based on user input, or may be automatically generated using, for example, image recognition;

Message sender identifier 922: an identifier (e.g., a messaging system identifier, email address or device identifier) indicative of a user of a client device on which message 900 was generated and from which message 900 was sent;

Message receiver identifier 924: an identifier (e.g., a messaging system identifier, email address or device identifier) indicative of a user of a client device to which message 900 is addressed;

The values or data of the various components of message 900 may be pointers to locations in tables within which the values or data are stored. For example, an image value in message image payload 906 may be a pointer to (or address of) a location within image table 808 of FIG. 8. Similarly, values within message video payload 908 may point to data stored within video table 810, values stored within message annotations 912 may point to data stored in annotation table 812, values stored within message story identifier 918 may point to data stored in story table 806, and values stored within message sender identifier 922 and message receiver identifier 924 may point to user records stored within entity table 802.

Figure 10:
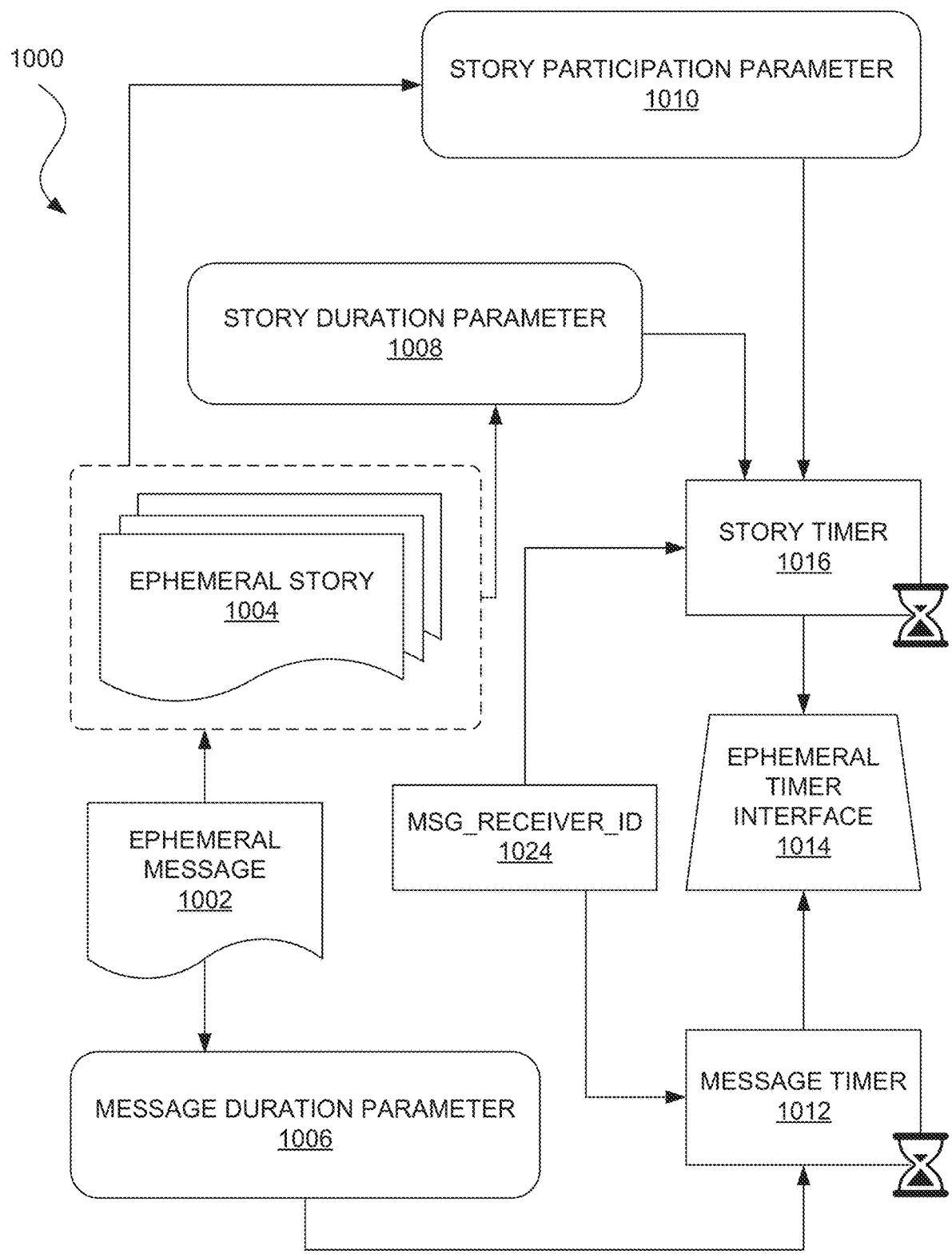
FIG. 10 illustrates an example of a data flow for time-limited content in accordance with an embodiment.

FIG. 10 shows an example of data flow 1000 in which access to content (e.g., ephemeral message 1002, and associated multimedia payload of data) and/or a content collection (e.g., ephemeral story 1004) may be time-limited (e.g., made ephemeral) by a content management system (e.g., content management system 700).

In this example, ephemeral message 1002 is shown to be associated with message duration parameter 1006, the value of which determines an amount of time that ephemeral message 1002 will be displayed to a receiving user of ephemeral message 1002 by a client application (e.g., client application 702). In one embodiment, where client application 702 is a SNAPCHAT® application client, ephemeral message 1002 is viewable by a receiving user for up to a maximum of 10 seconds that may be customizable by the sending user for a shorter duration.

Message duration parameter 1006 and message receiver identifier 1024 may be inputs to message timer 1012, which can be responsible for determining the amount of time that ephemeral message 1002 is shown to a particular receiving user identified by message receiver identifier 1024. For example, ephemeral message 1002 may only be shown to the relevant receiving user for a time period determined by the value of message duration parameter 1006. Message timer 1012 can provide output to ephemeral timer interface 1014 (e.g., an example of an implementation of ephemeral timer interface 706), which can be responsible for the overall timing of the display of content (e.g., ephemeral message 1002) to a receiving user.

Ephemeral message 1002 is shown in FIG. 10 to be included within ephemeral story 1004 (e.g., a personal SNAPCHAT® story, an event story, a content gallery, or other content collection). Ephemeral story 1004 maybe associated with story duration 1008, a value of which can establish a time-duration for which ephemeral story 1004 is presented and accessible to users of content management system 700. In an embodiment, story duration parameter 1008, may be the duration of a music concert and ephemeral story 1004 may be a collection of content pertaining to that concert. Alternatively, a user (either the owning user or a curator) may specify the value for story duration parameter 1008 when performing the setup and creation of ephemeral story 1004.

In some embodiments, each ephemeral message 1002 within ephemeral story 1004 may be associated with story participation parameter 1010, a value of which can set forth the duration of time for which ephemeral message 1002 will be accessible within the context of ephemeral story 1004. For example, a particular ephemeral story may "expire" and become inaccessible within the context of ephemeral story 1004, prior to ephemeral story 1004 itself expiring in terms of story duration parameter 1008. Story duration parameter 1008, story participation parameter 1010, and message receiver identifier 924 each provide input to story timer 1016, which can control whether a particular ephemeral message of ephemeral story 1004 will be displayed to a particular receiving user and, if so, for how long. In some embodiments, ephemeral story 1004 may also be associated with the identity of a receiving user via message receiver identifier 1024.

In some embodiments, story timer 1016 can control the overall lifespan of ephemeral story 1004, as well as ephemeral message 1002 included in ephemeral story 1004. In an embodiment, each ephemeral message 1002 within ephemeral story 1004 may remain viewable and accessible for a time-period specified by story duration parameter 1008. In another embodiment, ephemeral message 1002 may expire, within the context of ephemeral story 1004, based on story participation parameter 1010. In some embodiments, message duration parameter 1006 can still determine the duration of time for which a particular ephemeral message is displayed to a receiving user, even within the context of ephemeral story 1004. For example, message duration parameter 1006 can set forth the duration of time that a particular ephemeral message is displayed to a receiving user, regardless of whether the receiving user is viewing that ephemeral message inside or outside the context of ephemeral story 1004.

Ephemeral timer interface 1014 may remove ephemeral message 1002 from ephemeral story 1004 based on a determination that ephemeral message 1002 has exceeded story participation parameter 1010. For example, when a sending user has established a story participation parameter of 24 hours from posting, ephemeral timer interface 1014 will remove the ephemeral message 1002 from ephemeral story 1004 after the specified 24 hours. Ephemeral timer interface 1014 can also remove ephemeral story 1004 either when story participation parameter 1010 for each ephemeral message 1002 within ephemeral story 1004 has expired, or when ephemeral story 1004 itself has expired in terms of story duration parameter 1008.

In an embodiment, a creator of ephemeral message story 1004 may specify an indefinite story duration parameter. In this case, the expiration of story participation parameter 1010 for the last remaining ephemeral message within ephemeral story 1004 will establish when ephemeral story 1004 itself expires. In an embodiment, a new ephemeral message may be added to the ephemeral story 1004, with a new story participation parameter to effectively extend the life of ephemeral story 1004 to equal the value of story participation parameter 1010.

In some embodiments, responsive to ephemeral timer interface 1014 determining that ephemeral story 1004 has expired (e.g., is no longer accessible), ephemeral timer interface 1014 can communicate with content management system 700 (and, for example, specifically client application 702 to cause an indicium (e.g., an icon) associated with the relevant ephemeral message story to no longer be displayed within a user interface of client application 702). Similarly, when ephemeral timer interface 706 determines that message duration parameter 1006 for ephemeral message 1002 has expired, ephemeral timer interface 1014 may cause client application 702 to no longer display an indicium (e.g., an icon or textual identification) associated with ephemeral message 1002.

Figure 11:
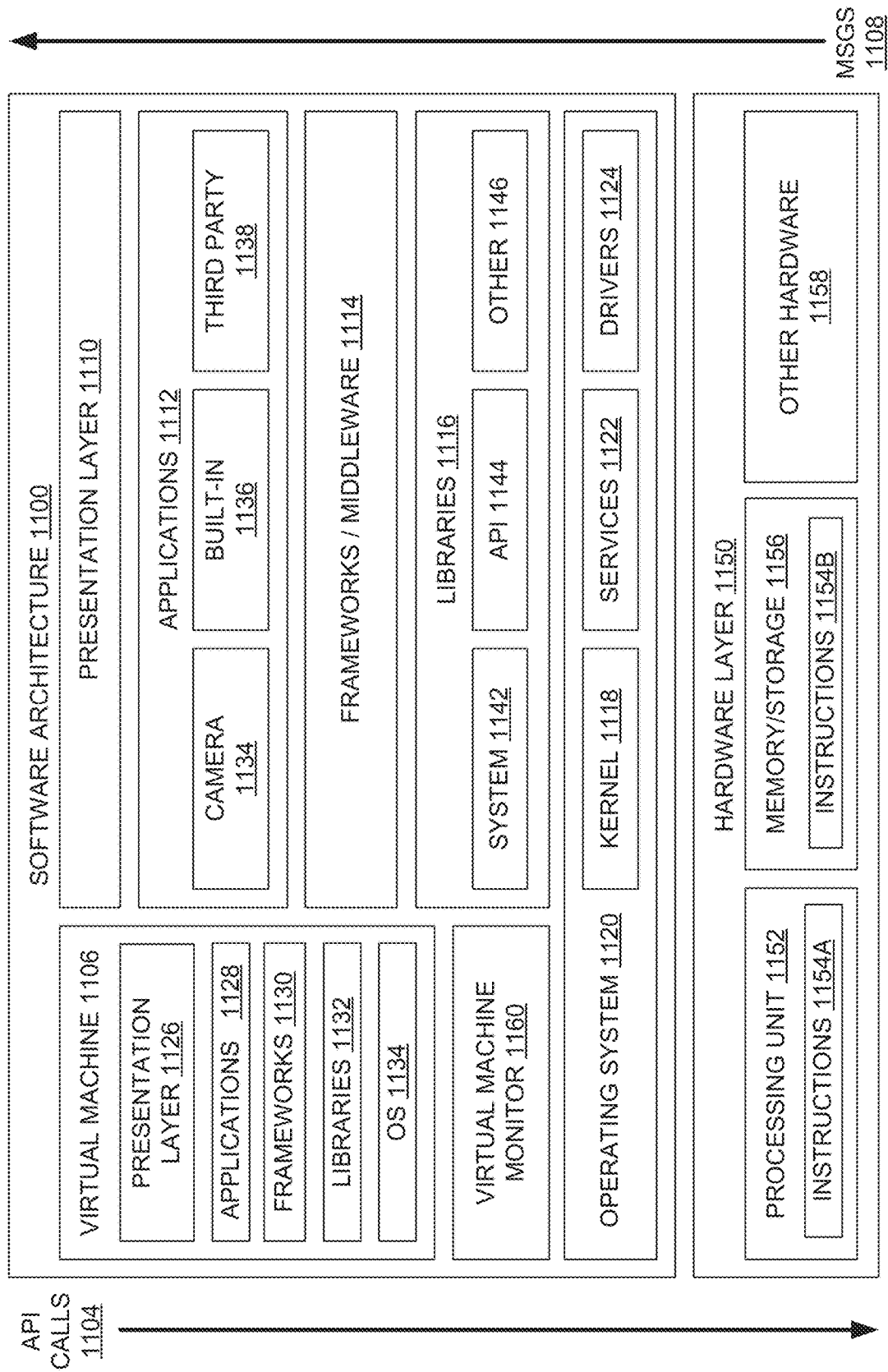
FIG. 11 illustrates an example of a software architecture in accordance with an embodiment.

FIG. 11 shows an example of a software architecture, software architecture 1100, which may be used in conjunction with various hardware architectures described herein. FIG. 11 is merely one example of a software architecture for implementing various embodiments of the present disclosure and other embodiments may utilize other architectures to provide the functionality described herein. Software architecture 1100 may execute on hardware such as computing system 1200 of FIG. 12, that includes processors 1204, memory/storage 1206, and I/O components 1218. Hardware layer 1150 can represent a computing system, such as computing system 1200 of FIG. 12. Hardware layer 1150 can include one or more processing units 1152 having associated executable instructions 1154A. Executable instructions 1154A can represent the executable instructions of software architecture 1100, including implementation of the methods, modules, and so forth of FIGS. 1A, 1B, 2A, 2B, 2C, 3A, 3B, 3C, 3D, 3E, 3F, 4A, 4B, 4C, and 5. Hardware layer 1150 can also include memory and/or storage modules 1156, which also have executable instructions 1154B. Hardware layer 1150 may also include other hardware 1158, which can represent any other hardware, such as the other hardware illustrated as part of computing system 1200.

In the example of FIG. 11, software architecture 1100 may be conceptualized as a stack of layers in which each layer provides particular functionality. For example, software architecture 1100 may include layers such as operating system 1120, libraries 1116, frameworks/middleware 1114, applications 1112, and presentation layer 1110. Operationally, applications 1112 and/or other components within the layers may invoke API calls 1104 through the software stack and receive a response, returned values, and so forth as messages 1108. The layers illustrated are representative in nature and not all software architectures have all layers. For example, some mobile or special-purpose operating systems may not provide a frameworks/middleware layer 1114, while others may provide such a layer. Other software architectures may include additional or different layers.

Operating system 1120 may manage hardware resources and provide common services. In this example, operating system 1120 includes kernel 1118, services 1122, and drivers 1124. Kernel 1118 may operate as an abstraction layer between the hardware and the other software layers. For example, kernel 1118 may be responsible for memory management, processor management (e.g., scheduling), component management, networking, security settings, and so on. Services 1122 may provide other common services for the other software layers. Drivers 1124 may be responsible for controlling or interfacing with the underlying hardware. For instance, drivers 1124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 1116 may provide a common infrastructure that may be utilized by applications 1112 and/or other components and/or layers. Libraries 1116 typically provide functionality that allows other software modules to perform tasks in an easier fashion than to interface directly with the underlying operating system functionality (e.g., kernel 1118, services 1122, and/or drivers 1124). Libraries 1116 may include system libraries 1142 (e.g., C standard library) that may provide functions such as memory allocation functions, string manipulation functions, mathematic functions, and the like. In addition, libraries 1116 may include API libraries 1144 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 1116 may also include a wide variety of other libraries 1146 to provide many other APIs to applications 1112 and other software components/modules.

Frameworks 1114 (sometimes also referred to as middleware) may provide a higher-level common infrastructure that may be utilized by applications 1112 and/or other software components/modules. For example, frameworks 1114 may provide various graphic user interface (GUI) functions, high-level resource management, high-level location services, and so forth. Frameworks 1114 may provide a broad spectrum of other APIs that may be utilized by applications 1112 and/or other software components/modules, some of which may be specific to a particular operating system or platform.

Applications 1112 include camera application 1134, built-in applications 1136, and/or third-party applications 1138. Examples of representative built-in applications 1136 include a contacts application, a browser application, a book reader application, a location application, a media application, a messaging application, and/or a game application.

Third-party applications 1138 may include any built-in applications 1136 as well as a broad assortment of other applications. In an embodiment, third-party application 1138 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or other mobile operating systems. In this example, third-party application 1138 may invoke API calls 1104 provided by operating system 1120 to facilitate functionality described herein.

Applications 1112 may utilize built-in operating system functions (e.g., kernel 1118, services 1122, and/or drivers 1124), libraries (e.g., system libraries 1142, API libraries 1144, and other libraries 1146), or frameworks/middleware 1114 to create user interfaces to interact with users of the system. Alternatively, or in addition, interactions with a user may occur through a presentation layer, such as presentation layer 1110. In these systems, the application/module "logic" can be separated from the aspects of the application/module that interact with a user.

Some software architectures utilize virtual machines. In the example of FIG. 11, this is illustrated by virtual machine 1106. A virtual machine creates a software environment where applications/modules can execute as if they were executing on a physical computing device (e.g., computing system 1200 of FIG. 12). Virtual machine 1106 is hosted by a host operating system (e.g., operating system 1120). The host operating system typically has a virtual machine monitor 1160, which may manage the operation of virtual machine 1106 as well as the interface with the host operating system (e.g., operating system 1120). A software architecture executes within virtual machine 1106, and may include operating system 1134, libraries 1132, frameworks/middleware 1130, applications 1128, and/or presentation layer 1126. These layers executing within virtual machine 1106 can operate similarly or differently to corresponding layers previously described.

Figure 12:
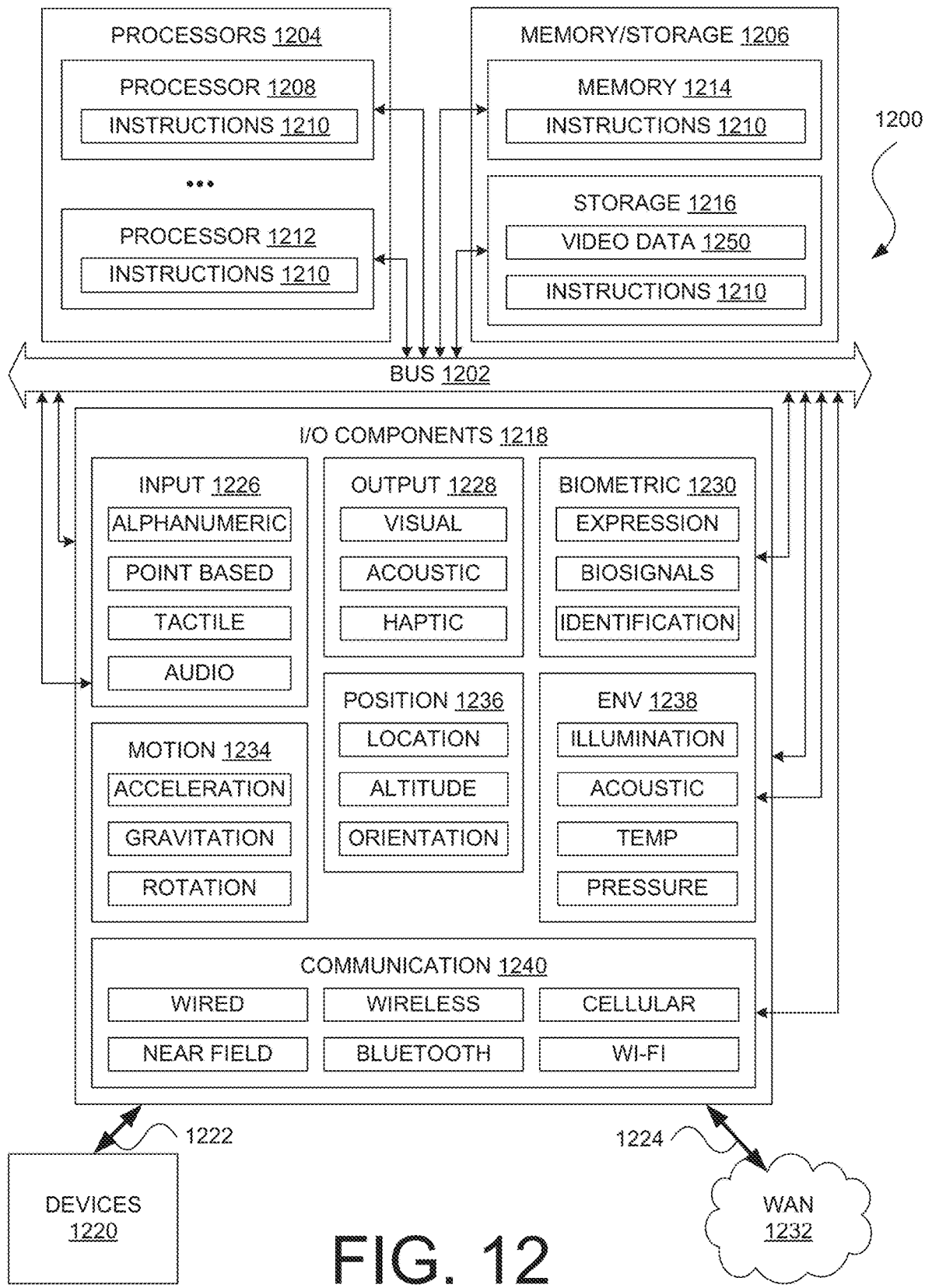
FIG. 12 illustrates an example of a computing system in accordance with an embodiment.

FIG. 12 shows an example of a computing device, computing system 1200, in which various embodiments of the present disclosure may be implemented. In this example, computing system 1200 can read instructions 1210 from a computer-readable medium (e.g., a computer-readable storage medium) and perform any one or more of the methodologies discussed herein. Instructions 1210 may include software, a program, an application, an applet, an app, or other executable code for causing computing system 1200 to perform any one or more of the methodologies discussed herein. For example, instructions 1210 may cause computing system 1200 to execute process 500 of FIG. 5. In addition or alternatively, instructions 1210 may implement the camera application of FIGS. 1A and 1B, generate the sampling patterns 2A, 2B, 2C, 3A, 3B, 3C, 3D, 3E, and 3F or the histograms of FIGS. 4A, 4B, and 4C; application logic modules 612 or video modules 614 of FIG. 6; camera application 1134, and so forth. Instructions 1210 can transform a general, non-programmed computer, such as computing system 1200 into a particular computer programmed to carry out the functions described herein.

In some embodiments, computing system 1200 can operate as a standalone device or may be coupled (e.g., networked) to other devices. In a networked deployment, computing system 1200 may operate in the capacity of a server or a client device in a server-client network environment, or as a peer device in a peer-to-peer (or distributed) network environment. Computing system 1200 may include a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions 1210, sequentially or otherwise, that specify actions to be taken by computing system 1200. Further, while a single device is illustrated in this example, the term "device" shall also be taken to include a collection of devices that individually or jointly execute instructions 1210 to perform any one or more of the methodologies discussed herein.

Computing system 1200 may include processors 1204, memory/storage 1206, and I/O components 1218, which may be configured to communicate with each other such as via bus 1202. In some embodiments, processors 1204 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 1208 and processor 1212 for executing some or all of instructions 1210. The term "processor" is intended to include a multi-core processor that may comprise two or more independent processors (sometimes also referred to as "cores") that may execute instructions contemporaneously. Although FIG. 12 shows multiple processors 1204, computing system 1200 may include a single processor with a single core, a single processor with multiple cores (e.g., a multi-core processor), multiple processors with a single core, multiple processors with multiples cores, or any combination thereof.

Memory/storage 1206 may include memory 1214 (e.g., main memory or other memory storage) and storage 1216 (e.g., a hard-disk drive (HDD) or solid state device (SSD) may be accessible to processors 1204, such as via bus 1202. Storage 1216 and memory 1214 store instructions 1210, which may embody any one or more of the methodologies or functions described herein. Storage 1216 may also store video data 1250, including videos, clips, sampling patterns, and other data discussed in the present disclosure. Instructions 1210 may also reside, completely or partially, within memory 1214, within storage 1216, within processors 1204 (e.g., within the processor's cache memory), or any suitable combination thereof, during execution thereof by computing system 1200. Accordingly, memory 1214, storage 1216, and the memory of processors 1204 are examples of computer-readable media.

As used herein, "computer-readable medium" means an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store instructions 1210. The term "computer-readable medium" can also include any medium, or combination of multiple media, that is capable of storing instructions (e.g., instructions 1210) for execution by a computer (e.g., computing system 1200), such that the instructions, when executed by one or more processors of the computer (e.g., processors 1204), cause the computer to perform any one or more of the methodologies described herein. Accordingly, a "computer-readable medium" refers to a single storage apparatus or device, as well as "cloud-based" storage systems or storage networks that include multiple storage apparatus or devices. The term "computer-readable medium" excludes signals per se.

I/O components 1218 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, I/O components 1218 may include output components 1226 and input components 1228. Output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1218 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In some embodiments, I/O components 1218 may also include biometric components 1230, motion components 1234, environmental components 1236, or position components 1238 among a wide array of other components. For example, biometric components 1230 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. Motion components 1234 may include acceleration sensor components (e.g., accelerometer), gravitation sensor components, rotation sensor components (e.g., gyroscope), and so forth. Environmental components 1236 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. Position components 1236 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. I/O components 1218 may include communication components 1240 operable to couple computing system 1200 to WAN 1232 or devices 1220 via coupling 1224 and coupling 1222 respectively. For example, communication components 1240 may include a network interface component or other suitable device to interface with WAN 1232. In some embodiments, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 1220 may be another computing device or any of a wide variety of peripheral devices (e.g., a peripheral device coupled via USB).

Moreover, communication components 1240 may detect identifiers or include components operable to detect identifiers. For example, communication components 1240 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via communication components 1240, such as location via Internet Protocol (IP) geolocation, location via Wi-Fi® signal triangulation, location via detecting an NFC beacon signal that may indicate a particular location, and so forth.

In various embodiments, one or more portions of WAN 1232 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, WAN 1232 or a portion of WAN 1232 may include a wireless or cellular network and coupling 1224 may be a Code Division Multiple Access (CDMA) connection, a Global System for Mobile communications (GSM) connection, or another type of cellular or wireless coupling. In this example, coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

Instructions 1210 may be transmitted or received over WAN 1232 using a transmission medium via a network interface device (e.g., a network interface component included in communication components 1240) and utilizing any one of several well-known transfer protocols (e.g., HTTP). Similarly, instructions 1210 may be transmitted or received using a transmission medium via coupling 1222 (e.g., a peer-to-peer coupling) to devices 1220. The term "transmission medium" includes any intangible medium that is capable of storing, encoding, or carrying instructions 1210 for execution by computing system 1200, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    determining, by a computing device, individual numbers of frames to sample from a first video clip for a plurality of intervals of time based on a pattern for sampling the first video clip, the determining comprising evaluating a histogram corresponding to the pattern over the plurality of intervals of time, the histogram relating a time value and a number of frames to sample from the first clip at the time value, the pattern being associated with a video effect being applied to the first video clip;
    extracting, by the computing device, a plurality of frames of the first clip using the individual numbers of frames; and
    generating, by the computing device, a second clip based on the plurality of frames.

2. The method of claim 1, wherein the number of frames at the time value is less than a frame rate of the first video and the histogram causes the first video to be sub-sampled at the time value.

3. The method of claim 1, wherein the number of frames at the time value is greater than a frame rate of the first video and the histogram causes given frames of the first video at the time value to be interpolated.

4. The method of claim 3, wherein the given frames of the first video at the time value are interpolated by repeating one or more of the given frames.

5. The method of claim 3, wherein the given frames of the first video at the time value are interpolated by merging at least two of the given frames.

6. The method of claim 1, further comprising:
    displaying a selection bar and a selection slider; and
    determining a selection of the first clip from the video based on a position of the selection slider relative to the selection bar.

7. The method of claim 6, further comprising:
    determining a relative length of the selection slider with respect to the selection bar based on a relationship between a first length of time of the first clip and a second length of time of the video.

8. The method of claim 1, further comprising:
    receiving an adjustment factor for determining a second length of time of the second clip relative to a first length of time of the first clip, wherein the plurality of intervals of time occur within the second length of time.

9. The method of claim 1, further comprising:
    displaying a plurality of predetermined sampling patterns; and
    receiving the pattern from one of the plurality of predetermined sampling patterns.

10. The method of claim 1, further comprising:
    displaying a drawing interface; and
    receiving the pattern as a drawing from the drawing interface.

11. The method of claim 1, further comprising:
    generating a third clip by reversing the plurality of frames; and
    presenting the second clip and the third clip on a display of the computing device.

12. The method of claim 1, further comprising:
    receiving, at the computing device, a user input identifying a selection of a second pattern for sampling the first clip;
    determining second individual numbers of frames to sample from the first clip for a second plurality of intervals of time using the second pattern;
    extracting a second plurality of frames of the first clip using the second individual number of frames; and
    generating a third clip using the second plurality of frames.

13. A device comprising:
    one or more processors; and
    memory including instructions that, upon execution by the one or more processors, cause the device to perform operations comprising:
        determining individual numbers of frames to sample from a first video clip for a plurality of intervals of time based on a pattern for sampling the first video clip, the determining comprising evaluating a histogram corresponding to the pattern over the plurality of intervals of time, the histogram relating a time value and a number of frames to sample from the first clip at the time value, the pattern being associated with a video effect being applied to the first video clip;

extracting a plurality of frames of the first clip using the individual numbers of frames; and generating a second clip based on the plurality of frames.

14. The device of claim 13, wherein the number of frames at the time value is less than a frame rate of the first video and the histogram causes the first video to be sub-sampled at the time value.

15. The device of claim 13, wherein the number of frames at the time value is greater than a frame rate of the first video and the histogram causes given frames of the first video at the time value to be interpolated.

16. The device of claim 15, wherein the given frames of the first video at the time value are interpolated by repeating one or more of the given frames.

17. The device of claim 15, wherein the given frames of the first video at the time value are interpolated by merging at least two of the given frames.

18. The device of claim 13, wherein the operations further comprise:

displaying one or more user interface elements on a touchscreen of the device; and receive, at the touchscreen, a length of time for the second clip from the one or more user interface elements, wherein the plurality of intervals of time occur within the length of time.

19. The device of claim 13, wherein the operations further comprise:

receiving, at a touchscreen of the device, a selection of a second pattern for sampling the first clip;

determining second individual numbers of frames to sample from the first clip for a second plurality of intervals of time using the second pattern;

extracting a second plurality of frames of the first clip using the second individual number of frames; and generating a third clip using the second plurality of frames.

20. A non-transitory computer-readable storage medium storing instructions that, upon execution by one or more processors of a device, cause the device to perform operations comprising:

determining individual numbers of frames to sample from a first video clip for a plurality of intervals of time based on a pattern for sampling the first video clip, the determining comprising evaluating a histogram corresponding to the pattern over the plurality of intervals of time, the histogram relating a time value and a number of frames to sample from the first clip at the time value, the pattern being associated with a video effect being applied to the first video clip;

extracting a plurality of frames of the first clip using the individual numbers of frames; and generating a second clip based on the plurality of frames.

* * * * *